(12) United States Patent
Jäderberg

(10) Patent No.: US 12,266,452 B2
(45) Date of Patent: Apr. 1, 2025

(54) PLASMA CONFINEMENT DEVICE AND METHOD FOR PLASMA CONFINEMENT

(71) Applicant: Novatron Fusion Group AB, Spånga (SE)

(72) Inventor: Jan Jäderberg, Spånga (SE)

(73) Assignee: Novatron Fusion Group AB, Spånga (SE)

( * ) Notice: Subject to any disclaimer, the term of this patent is extended or adjusted under 35 U.S.C. 154(b) by 388 days.

(21) Appl. No.: 17/771,684

(22) PCT Filed: Nov. 11, 2020

(86) PCT No.: PCT/EP2020/081762
§ 371 (c)(1),
(2) Date: Apr. 25, 2022

(87) PCT Pub. No.: WO2021/094372
PCT Pub. Date: May 20, 2021

(65) Prior Publication Data
US 2022/0367069 A1    Nov. 17, 2022

(30) Foreign Application Priority Data

Nov. 11, 2019 (EP) .................................... 19208258

(51) Int. Cl.
*G21B 1/05* (2006.01)
*H05H 1/00* (2006.01)
*H05H 1/14* (2006.01)

(52) U.S. Cl.
CPC ................ *G21B 1/05* (2013.01); *H05H 1/00* (2013.01); *H05H 1/14* (2013.01)

(58) Field of Classification Search
None
See application file for complete search history.

(56) References Cited

U.S. PATENT DOCUMENTS

| 4,237,507 A | 12/1980 | Meierovich et al. |
| 2014/0301517 A1* | 10/2014 | McGuire .................. H05H 1/14 376/142 |

(Continued)

FOREIGN PATENT DOCUMENTS

| JP | 55024417 A | 2/1980 |
| JP | H01161189 A | 6/1989 |

OTHER PUBLICATIONS

Office Action mailed in JP Application No. 2022-553218 on Jun. 25, 2024, 8 pages (4 pages of Official Copy & 4 pages of English Translation).

(Continued)

*Primary Examiner* — Wilson Lee
(74) *Attorney, Agent, or Firm* — Kagan Binder, PLLC

(57) ABSTRACT

A plasma confinement device (500), comprises a first magnet system (1) comprising a first plurality of concentrically arranged circular-loop coils (11, 12), comprising a first coil (11) arranged to carry a current in a first direction; and a second coil (12) arranged to carry a current in a second direction opposite to the first direction; and a second magnet system (2) comprising a second plurality of concentrically arranged circular-loop coils (21, 22), arranged with mirror symmetry with respect to the first magnet system (1) relative to a symmetry plane (P) located between the first magnet system (1) and the second magnet system (2), creating an annular plasma confinement area (206) at the symmetry plane (P) with a magnetic field normal to the symmetry plane (P) at the symmetry plane (P).

12 Claims, 22 Drawing Sheets

(56) References Cited

U.S. PATENT DOCUMENTS

| | | |
|---|---|---|
| 2018/0254153 A1 | 9/2018 | Mizuki |
| 2018/0277259 A1* | 9/2018 | Jacobson ................ H05H 1/10 |
| 2019/0221322 A1 | 7/2019 | McGuire |
| 2021/0029812 A1* | 1/2021 | Connell .................. H05H 1/54 |
| 2021/0265068 A1* | 8/2021 | Buxton ................... G21B 1/13 |

OTHER PUBLICATIONS

International Search Report for International Application No. PCT/EP2020/081762, mailed Jan. 29, 2021, (2 pages).

* cited by examiner

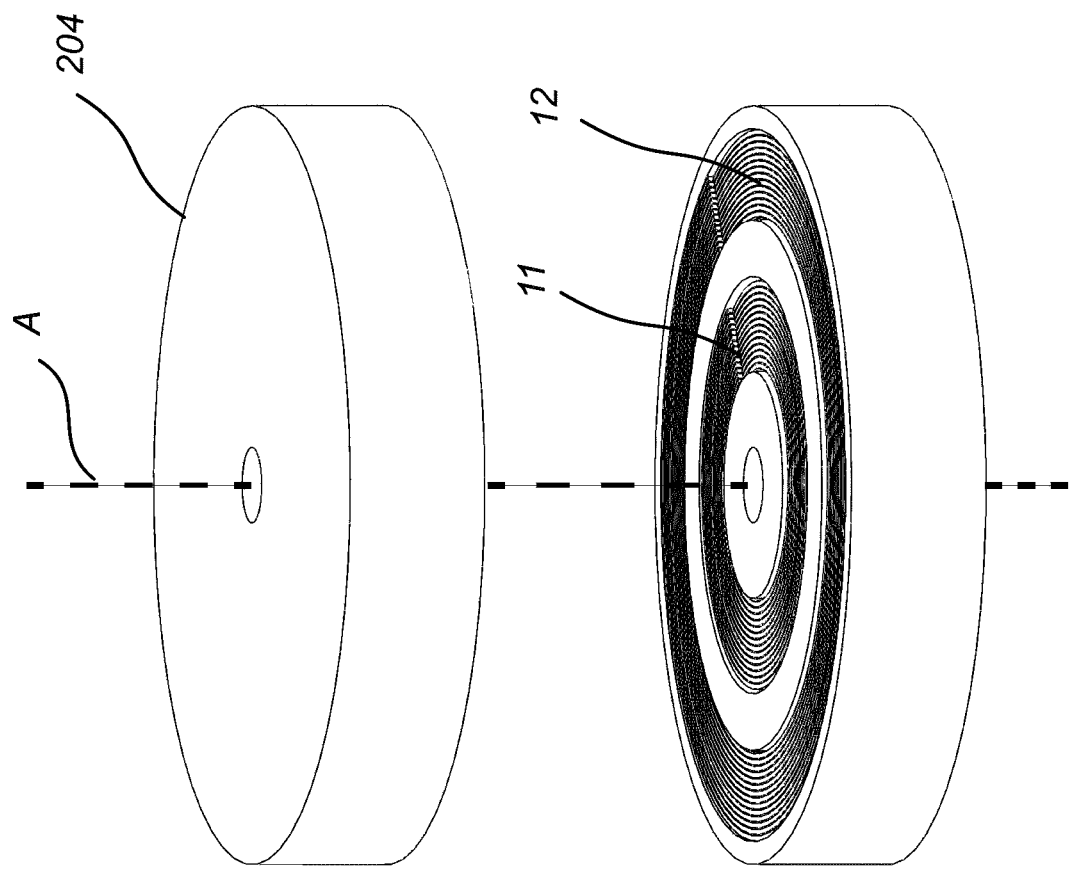

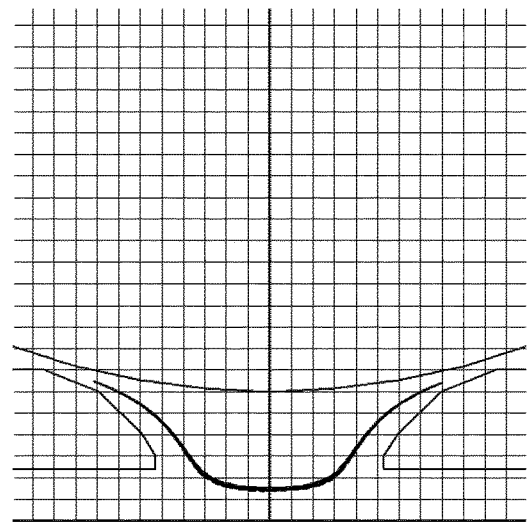
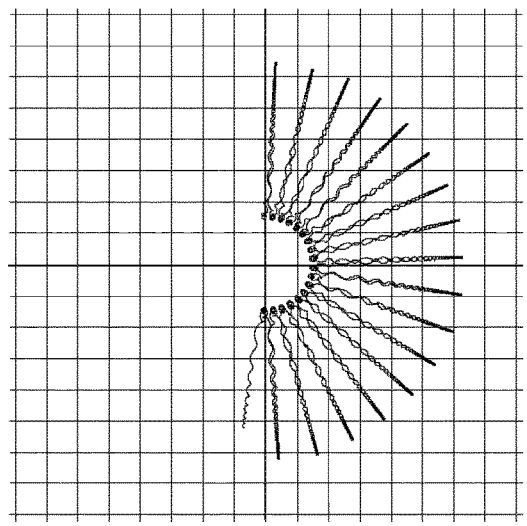
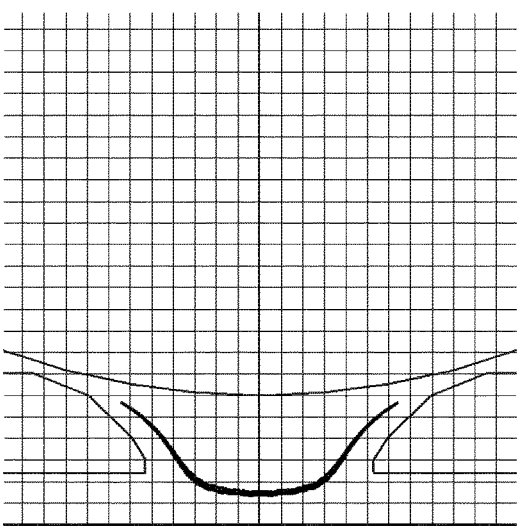
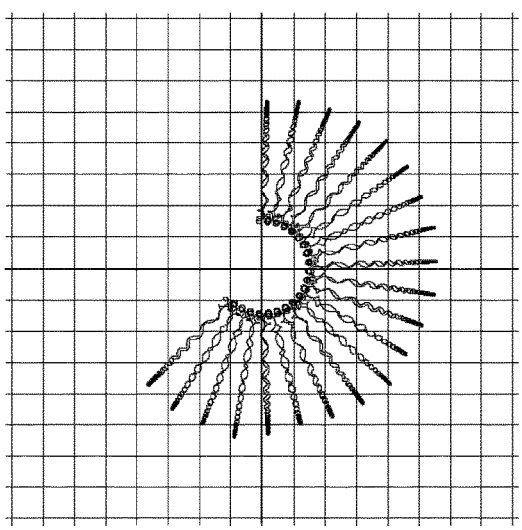
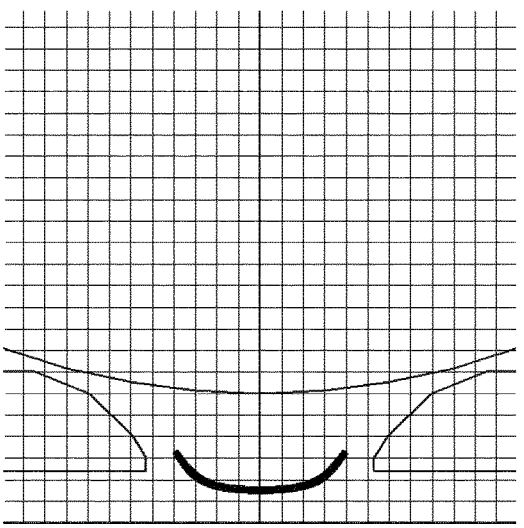
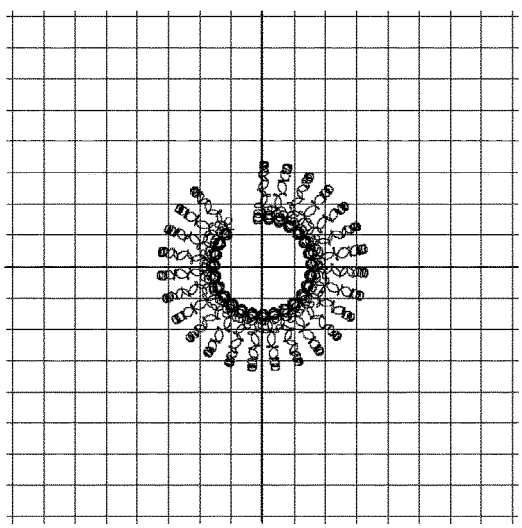
Fig. 15

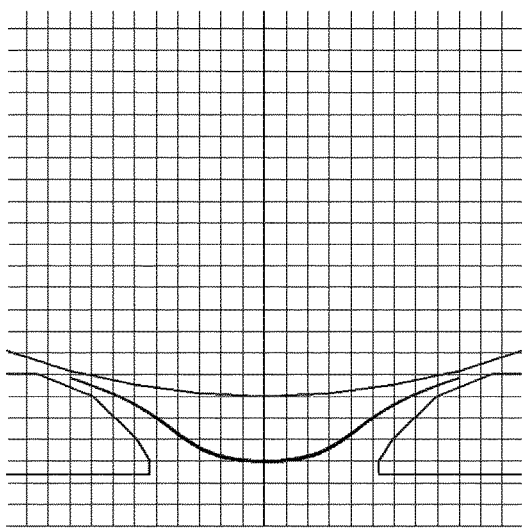
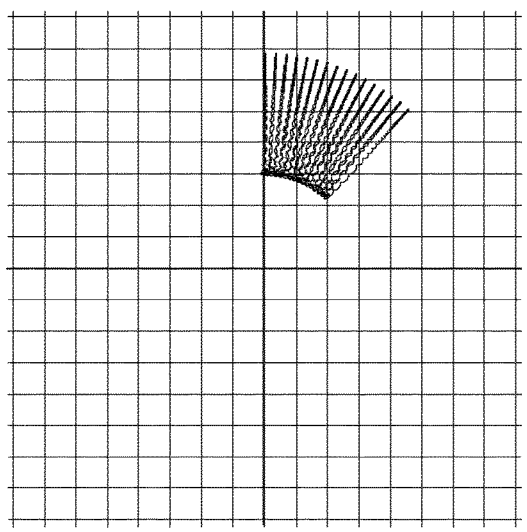
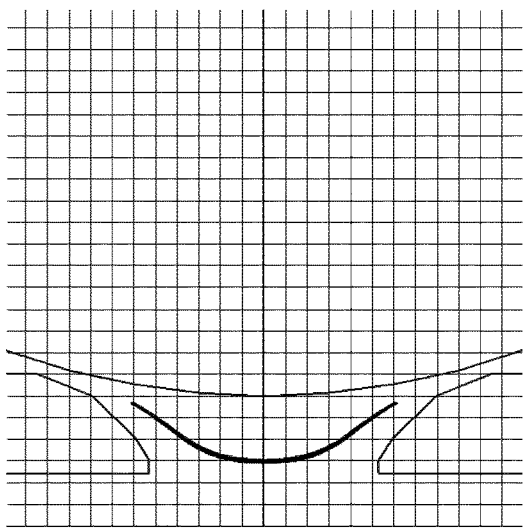
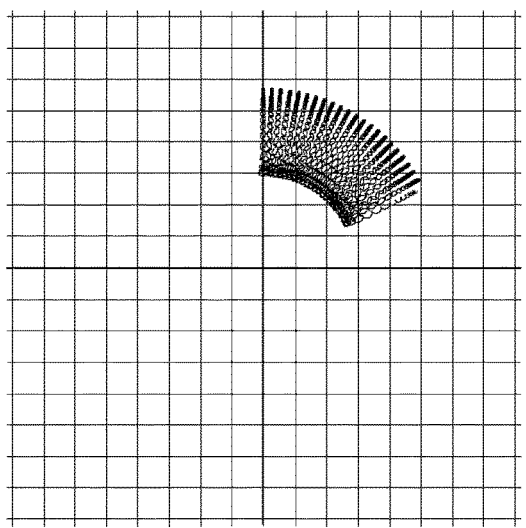
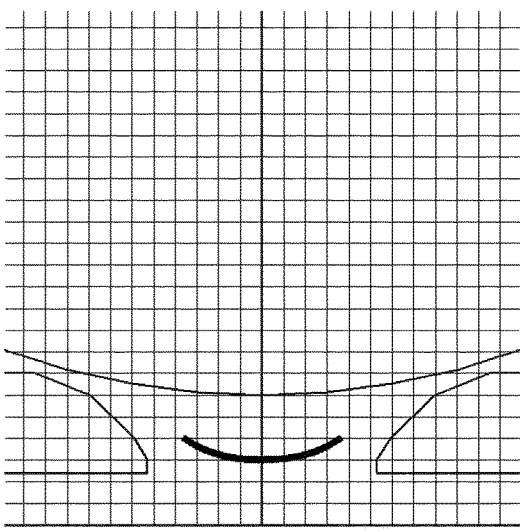
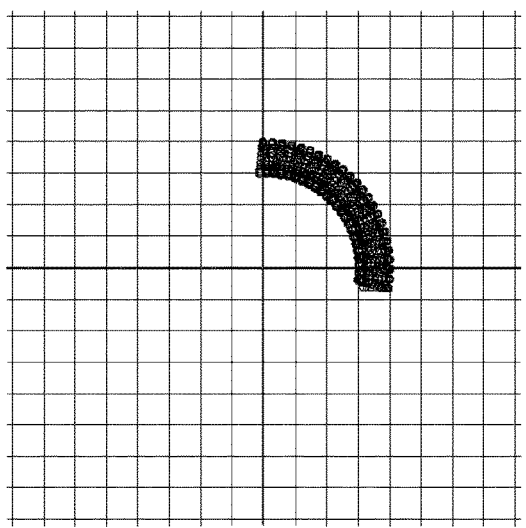
Fig. 16

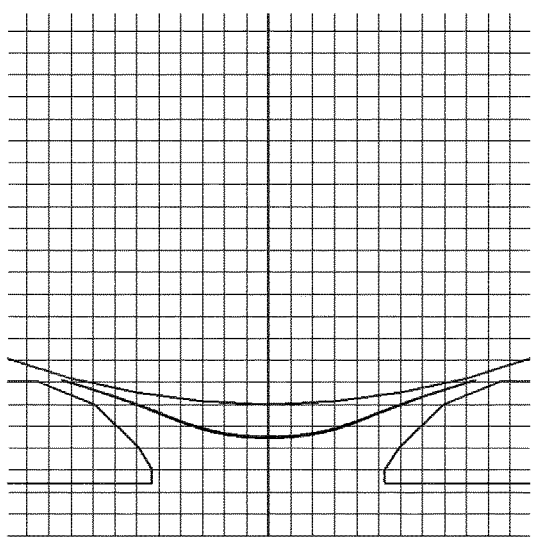
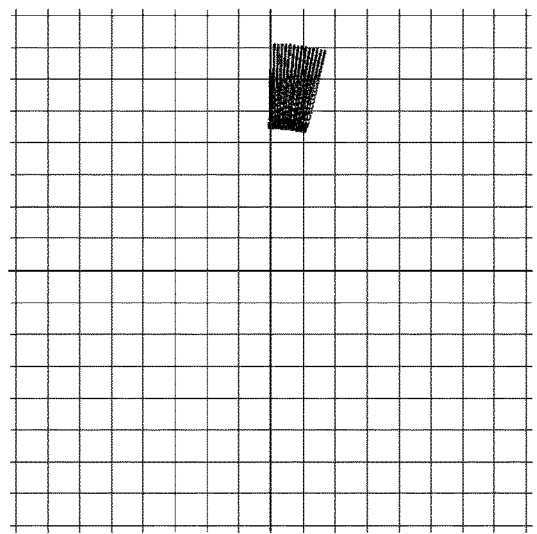
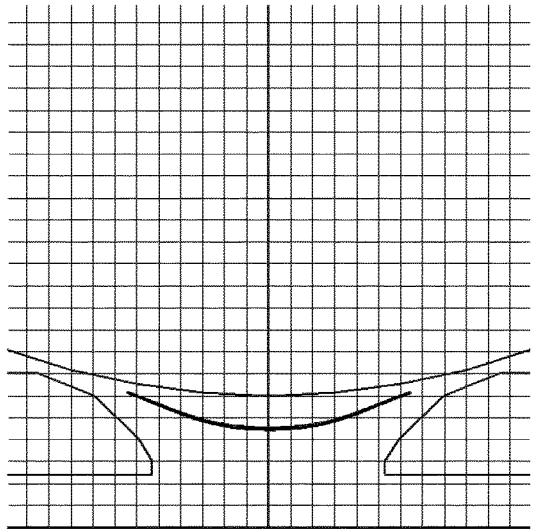
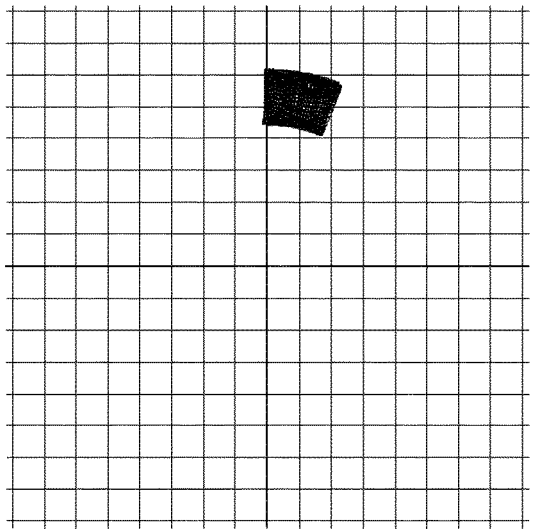
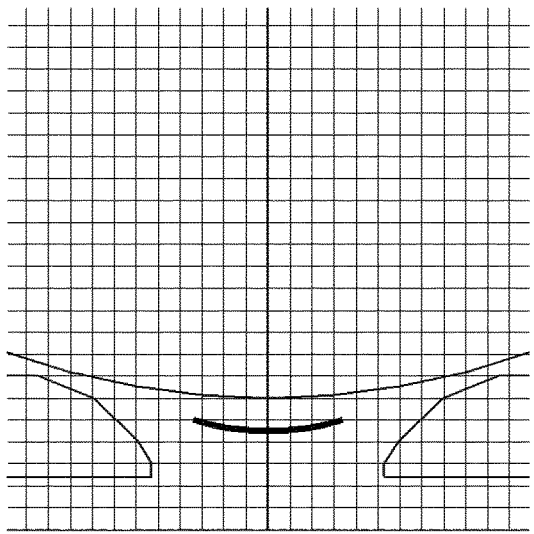
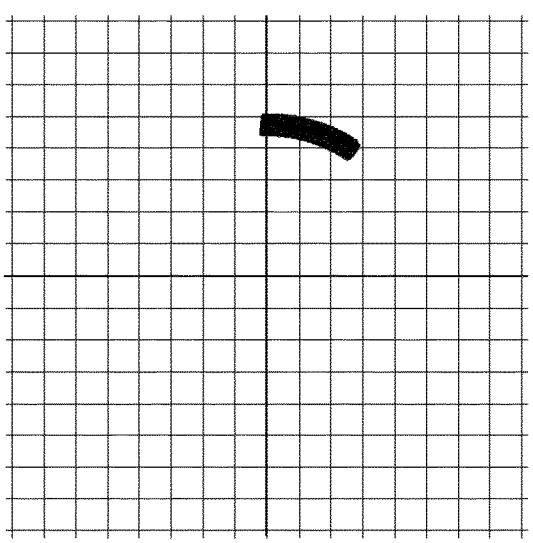
Fig. 17

PLASMA CONFINEMENT DEVICE AND METHOD FOR PLASMA CONFINEMENT

CROSS-REFERENCE TO RELATED APPLICATIONS

This application claims priority to International Application No. PCT/EP2020/081762, filed Nov. 11, 2020 and titled "PLASMA CONFINEMENT DEVICE AND METHOD FOR PLASMA CONFINEMENT," which in turn claims priority from a European Patent Application having Ser. No. 19/208,258.4, filed Nov. 11, 2019, both of which are incorporated herein by reference in their entireties.

FIELD OF TECHNOLOGY

The present disclosure relates to a plasma confinement device and to a method for plasma confinement.

BACKGROUND

Great efforts are being made to design a reactor for controlled fusion on earth. The most promising fusion process is between the hydrogen isotopes deuterium ($^2$H) and tritium ($^3$H). In the deuterium-tritium fusion prosses, a $^4$He alpha particle, having a kinetic energy of about 3.5 MeV and a neutron, having a kinetic energy of about 14.1 MeV, are created.

For fusion to occur, nuclei must be in the form of a plasma having a temperature in the order of 150 million kelvins. Providing confinement for such a plasma remains a major challenge.

There are several different known magnetic configurations for plasma confinement.

Plasma confinement involves confining the charged particles of the plasma. Further, various properties beneficial to the stability of the confined plasma may be desirable.

A well-known design is the magnetic mirror. Therein, particles follow magnetic field lines and are reflected in areas of increasing magnetic flux density at the respective ends of the device. While capable of plasma confinement, as has been demonstrated experimentally, it is associated with various plasma instability problems. To solve these problems, various convoluted non-rotationally symmetric geometries have been proposed in the prior art, such as the "Minimum B" design, resembling a tennis ball, or the "Biconic Cusp".

Another well-known design is the tokamak. The tokamak uses a toroidal, i.e., donut-shaped, field for confinement. The tokamak, too, is associated with various plasma stability problems, such as charge separation.

SUMMARY

It is an object of the present disclosure to provide an improved plasma confinement device and method, in particular for use in fusion reactors.

To this end, according to a first aspect, there is provided a plasma confinement device, comprising a first magnet system, comprising a first plurality of concentrically arranged circular-loop coils, comprising a first coil arranged to carry a current in a first direction, and a second coil arranged to carry a current in a second direction opposite to the first direction; and a second magnet system comprising a second plurality of concentrically arranged circular-loop coils, arranged with mirror symmetry with respect to the first magnet system relative to a symmetry plane located between the first magnet system and the second magnet system, creating an annular plasma confinement area at the symmetry plane with a magnetic field normal to the symmetry plane at the symmetry plane.

As an annular plasma confinement area should be understood a rotationally symmetric region in which the charged particles of the plasma are confined, including cases having, for example, a donut-like or disc-like topology.

Hereby, the resulting magnetic field configuration may confine charged particles using static axial and radial fields in an open-field-line magnetic mirror configuration.

The arrangement with the first coil being arranged to carry a current in a first direction and the second coil being arranged to carry a current in an opposite, second, direction, in each of the first magnet system and the second magnet system, allows for the creation of a region of high magnetic flux density between the first coil and the second coil, while maintaining a relatively lower flux density near the symmetry plane. Compared to a conventional magnetic mirror arrangement, this allows for an increased mirror ratio, thereby reducing the size of the loss cone and allowing for better confinement of the plasma.

Moreover, compared to a tokamak, when confining a plasma, the charge separation effects may be avoided, where no induced plasma current may be needed for stability of the plasma. With the resulting quasi-static plasma, i.e., without a global plasma current, one may in turn avoid magnetohydrodynamic instabilities. Further, a fusion reactor may be allowed to run in a continuous (steady) state without current ramping.

Further, the resulting magnetic field configuration may allow for an uncomplicated way of heating the plasma.

The first plurality of concentrically arranged coils may, for example, be identically designed to the second plurality of concentrically arranged coils. This is a particularly simple way of achieving the desired magnetic field configuration.

The device may further comprise a third magnet system arranged radially outside the plasma confinement area, the third magnet system comprising at least one circular-loop coil.

Hereby, it is possible to arrange for a strictly radially increasing magnetic field, which may be beneficial for the stability of the confined plasma, further improving on a conventional magnetic mirror.

Further, the arrangement with a third magnet system may allow for arranging a concave magnetic field in the whole plasma confinement area, which may be beneficial for the stability of the confined plasma.

Thus, a rotationally symmetric open-field-line plasma confinement device may be provided that has a high mirror ratio and has properties beneficial for plasma stability.

Moreover, the third magnet system may allow controlling a confined plasma by current adjustment in the circular-loop coil of the third magnet system.

The third magnet system may comprise a first coil arranged on a same side of the symmetry plane at the first magnet system and a second coil arranged on an opposite side of the symmetry plane, wherein the second coil is arranged with mirror symmetry relative to the first coil.

The first plurality of concentrically arranged coils in the first magnet system and the second plurality of concentrically arranged coils in the second magnet system may each be embedded in respective ferromagnetic structures. This increases the magnetic flux through the relatively higher permeability of the ferromagnetic material, leading to a stronger magnetic field, and thereby better confinement, for a given coil current.

Optionally, a said ferromagnetic structure does not cover at least one coil of a respective said plurality of coils in a direction towards said symmetry plane. This shields magnetic flux in the direction away from the symmetry plane and directs the magnetic flux in the direction towards the symmetry plane, i.e., towards the plasma. Thereby, more efficient shielding is achieved for a given coil current.

A said ferromagnetic structure may be ferromagnetic steel.

The device according to the first aspect may be used for confining a plasma.

The device according to the first aspect may be used in a fusion reactor.

According to a second aspect, there is provided a method of plasma confinement, comprising, in a first magnet system, comprising a first plurality of concentrically arranged circular-loop coils, a first coil carrying a current in a first direction and a second coil carrying a current in a second direction opposite to the first direction; and a second magnet system comprising a second plurality of concentrically arranged circular-loop coils carrying currents with mirror symmetry with respect to the first magnet system relative to a symmetry plane located between the first magnet system and the second magnet system, creating an annular plasma confinement area at the symmetry plane with a magnetic field normal to the symmetry plane.

Embodiments and advantages of this second aspect may generally be similar to or the same as those of the first embodiment.

The method may further comprise controlling a confined plasma by current adjustment in a third magnet system arranged radially outside the plasma confinement area.

The controlling may comprise changing the radius of the plasma confinement area, which thereby, in turn, may change the radius of the plasma.

The method may further comprise heating the plasma by inserting an ion beam in an area radially outside the plasma confinement area or radially inside the plasma confinement area and allowing ions from the ion beam to drift into the plasma confinement area.

In contrast to existing solutions—such as Tokamaks or similar devices, where the magnetic field created to confine the plasma also deflects ions coming from outside from the plasma, and heating needs to be performed using neutral beams that will penetrate though the magnetic field and then only get ionized once inside the plasma—here, high-energy ions may conveniently and simply be added to the confined plasma, or provided for initial heating of the plasma to create a fusion condition, since the present magnetic field configuration may pull the ions into the plasma confinement area, rather than deflect them. This may lead to a less complicated procedure and may further reduce particle losses.

According to a third aspect, there is provided a magnetic mirror machine and/or a particle confinement device, comprising a first magnet system, comprising a first plurality of concentrically arranged circular-loop coils, comprising a first coil arranged to carry a current in a first direction, and a second coil arranged to carry a current in a second direction opposite to the first direction; and a second magnet system comprising a second plurality of concentrically arranged circular-loop coils, arranged with mirror symmetry with respect to the first magnet system relative to a symmetry plane located between the first magnet system and the second magnet system, creating an annular particle confinement area at the symmetry plane with a magnetic field normal to the symmetry plane at the symmetry plane.

Embodiments and advantages discussed in conjunction with the other aspects, and throughout this disclosure, are compatible with this third aspect.

According to a fourth aspect, there is provided a method of confining charged particles, comprising, in a first magnet system, comprising a first plurality of concentrically arranged circular-loop coils, a first coil carrying a current in a first direction and a second coil carrying a current in a second direction opposite to the first direction; and a second magnet system comprising a second plurality of concentrically arranged circular-loop coils carrying currents with mirror symmetry with respect to the first magnet system relative to a symmetry plane located between the first magnet system and the second magnet system, creating an annular particle confinement area at the symmetry plane with a magnetic field normal to the symmetry plane.

Embodiments and advantages discussed in conjunction with the other aspects, and throughout this disclosure, are compatible with this third aspect.

BRIEF DESCRIPTION OF THE DRAWINGS

The above, as well as additional objects, features and advantages of the present inventive concept, will be better understood through the following illustrative and non-limiting detailed description of preferred embodiments, with reference to the appended drawings, where the same reference numerals will be used for similar elements, wherein:

FIG. 1a is a perspective view of a first magnet system and a second magnet system that may be comprised in a plasma confinement device.

FIG. 1b is a cut-out perspective view of the first and second magnet systems of FIG. 1a.

FIG. 3b is a planar cross-sectional view of the first, second and third magnet systems of FIG. 3a.

FIGS. 15, 16, and 17 show, respectively, simulated charged particle trajectories with initial radial positions of 1.5 m, 3.0 m, and 4.5 m, each for $v_z/v_R$ ratios of 0.5, 1.5, 2.5.

DETAILED DESCRIPTION

Figure 1B:
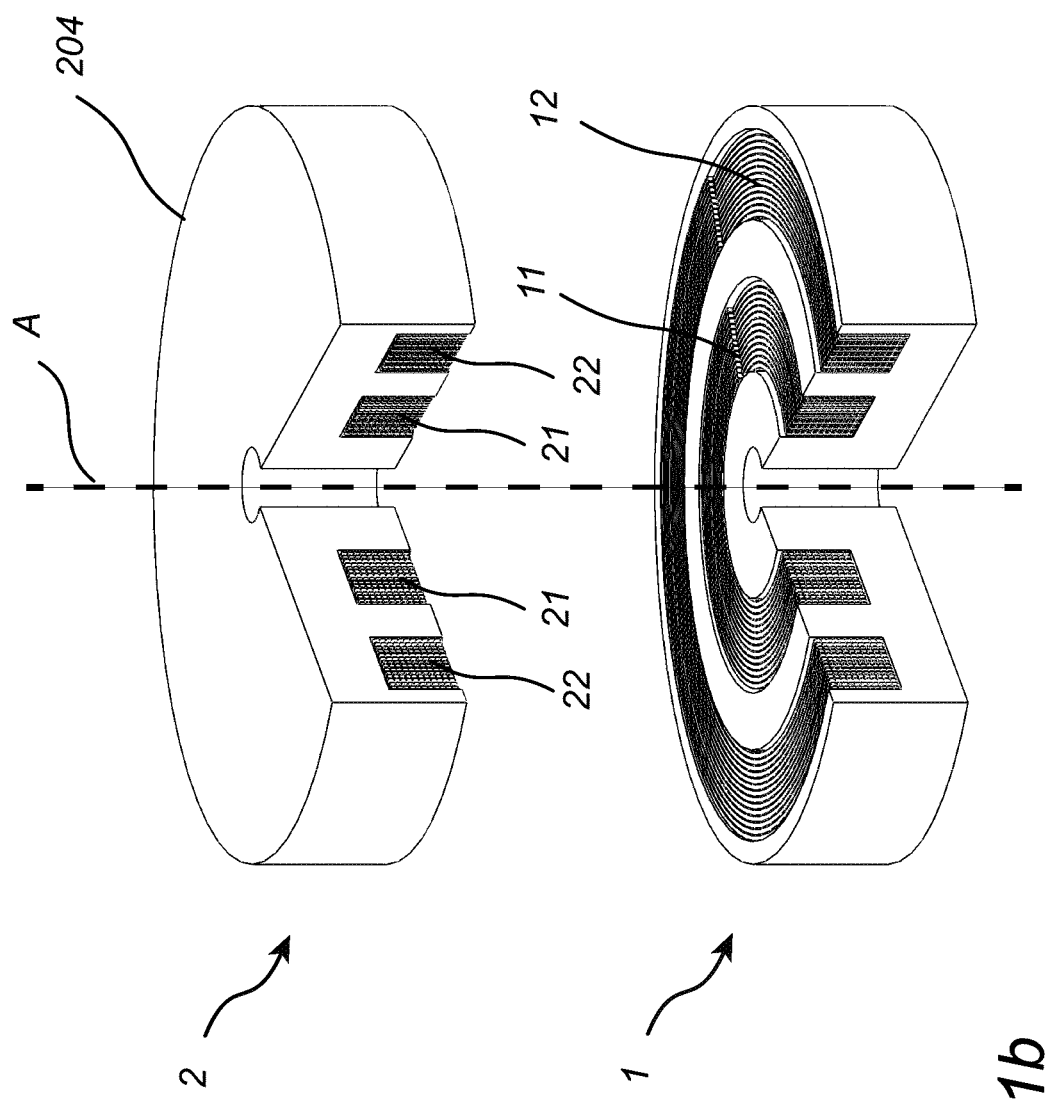

As is generally known, plasma confinement devices may be based either on open magnetic field lines or closed field lines.

Closed-field line devices may, for example, have a toroidal magnetic field. An example of such a device is a tokamak.

Closed-field-line devices may potentially confine plasma particles without leakage, as the particles will follow the field lines, but other issues, such as ExB drift due to charge separation and magneto-hydrodynamic (MHD) effects may cause a plasma to escape. Special arrangements need to be made for removing helium ash, such as pulsing the system, disallowing steady-state operation.

One major problem with the toroidal field is that ions will escape confinement due to ExB drift caused by charge separation.

In a tokamak, this problem may be addressed by inducing a current in the plasma, where the current will create a poloidal field. This results in the magnetic field twisting along the torus, with poloidal and toroidal fields together making up the twisted magnetic field. This mitigates the ExB drift but introduces an additional problem in that the plasma only will be confined while the current in the inner magnetic coil is ramping up, i.e. it is not possible to run in steady state.

Further, the plasma current will result in several instabilities related to magnetohydrodynamic effects, such as Kink instabilities. This may be addressed by various compensation coils around the reactor vessel, but the basic characteristics of the plasma will still be unstable due to the large magnetohydrodynamic effects.

Open-field-line plasma confinement devices, as known in the prior art, may operate by a principle of magnetic mirroring, wherein the charged particles of the plasma are reflected in areas of increasing magnetic flux density at the respective ends of the confinement area. Such machines have the ability of steady-state operation, and may generally have less problems with charge separation, and also allow for easier handling of helium ashes.

While recognized to be able to provide plasma confinement, open field-line plasma confinement devices will always have leakage of charge particles with velocity vectors sufficiently aligned with the magnetic field lines. More specifically, the mirror effect will occur for all particles within a range of angles of approach outside a loss cone defined by the helix spiral pitch angle of the charged particle's gyration spin around the magnetic field lines.

The extent of the loss cone is determined by the mirror ratio $r_{mirror}$, defined as the ratio between maximum $B_{max}$ and minimum $B_{min}$ magnetic flux density following a magnetic field line:

$$r_{mirror} = \frac{B_{max}}{B_{min}}.$$

The angle defining the loss cone is then:

$$\alpha_{cone} = \arccos \frac{1}{\sqrt{r_{mirror}}}.$$

Thus, it can be seen that high mirror ratio will lead to a small loss cone, so that only the particle having velocities the most aligned with the field lines will escape. Conversely, a low mirror ratio will lead to a larger loss cone.

A first property, known from literature, of the magnetic field lines of a plasma confinement device, associated with magneto-hydrodynamic stability of the confined plasma, is a concave magnetic field, i.e., a magnetic field having concave magnetic field lines, as seen from outside the plasma confinement area and the confined plasma.

A second property, known from literature, of the magnetic field lines of a plasma confinement device, associated with magneto-hydrodynamic stability of the confined plasma, is a radially strictly increasing magnetic field.

Figure 1C:
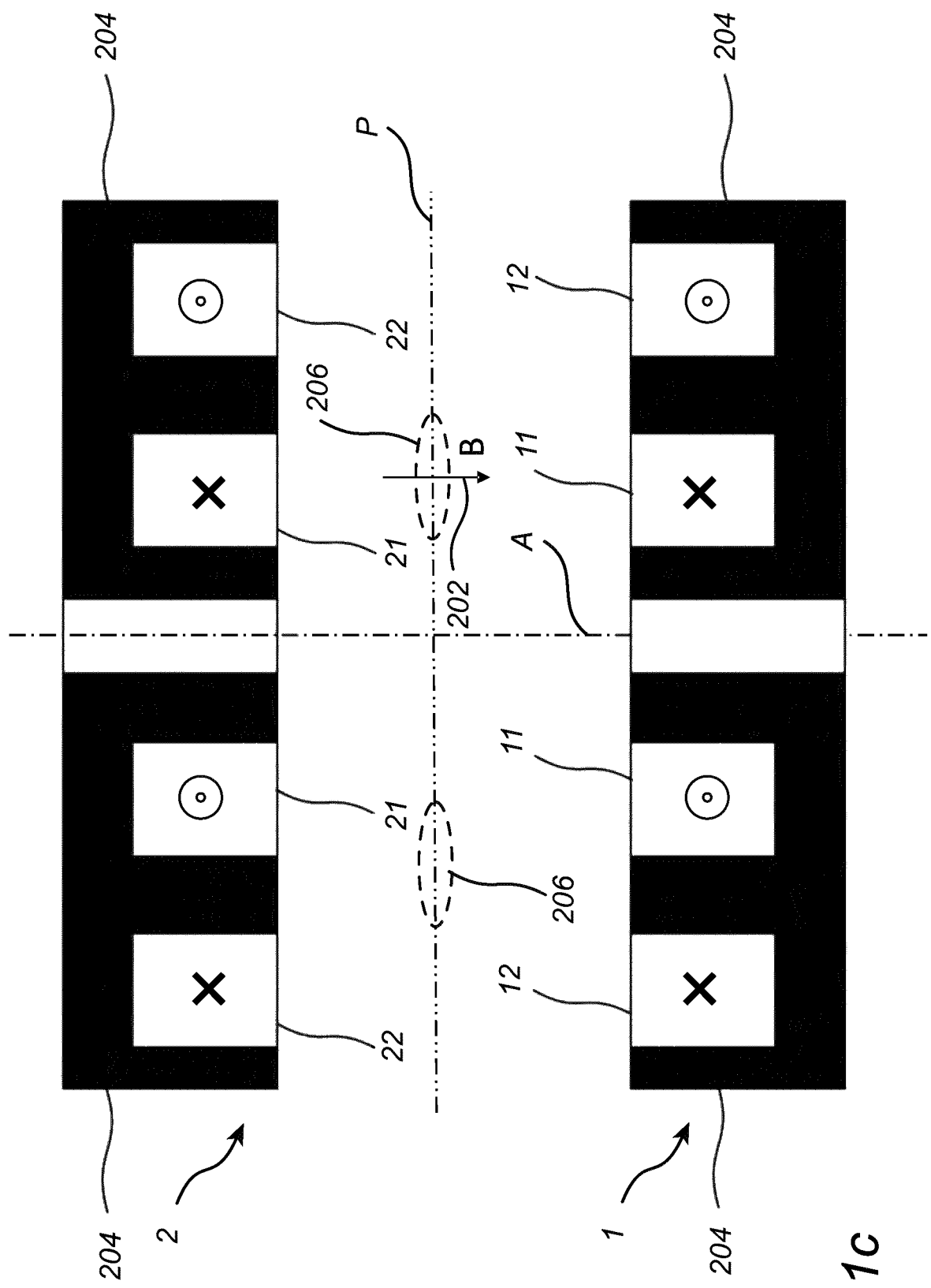
FIG. 1c is a planar cross-sectional view of the first and second magnet systems of FIGS. 1a and 1b.
Figure 5A:
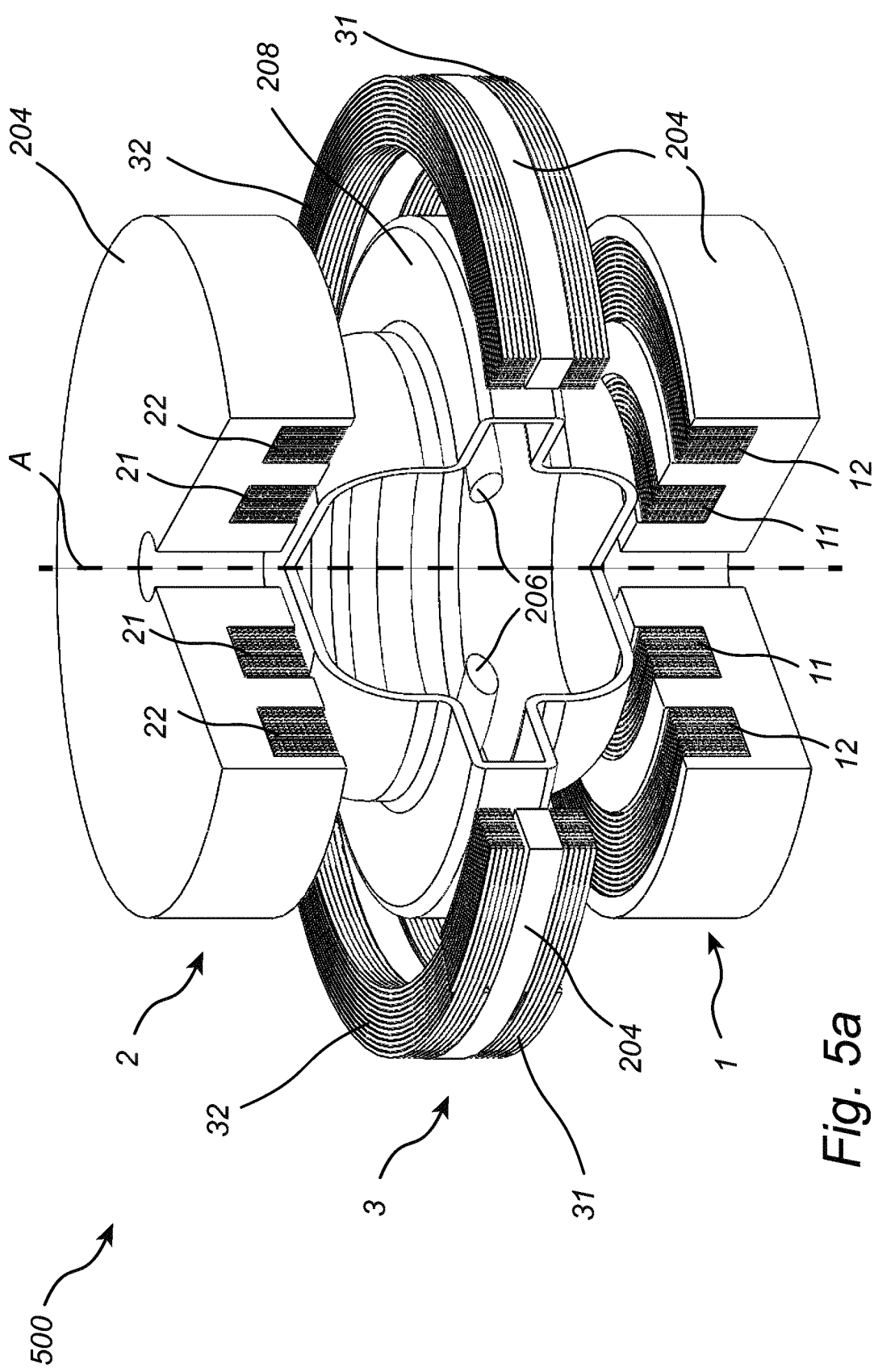
FIGS. 5a and 5b are cut-out perspective drawings showing plasma confinement devices.
Figure 5B:
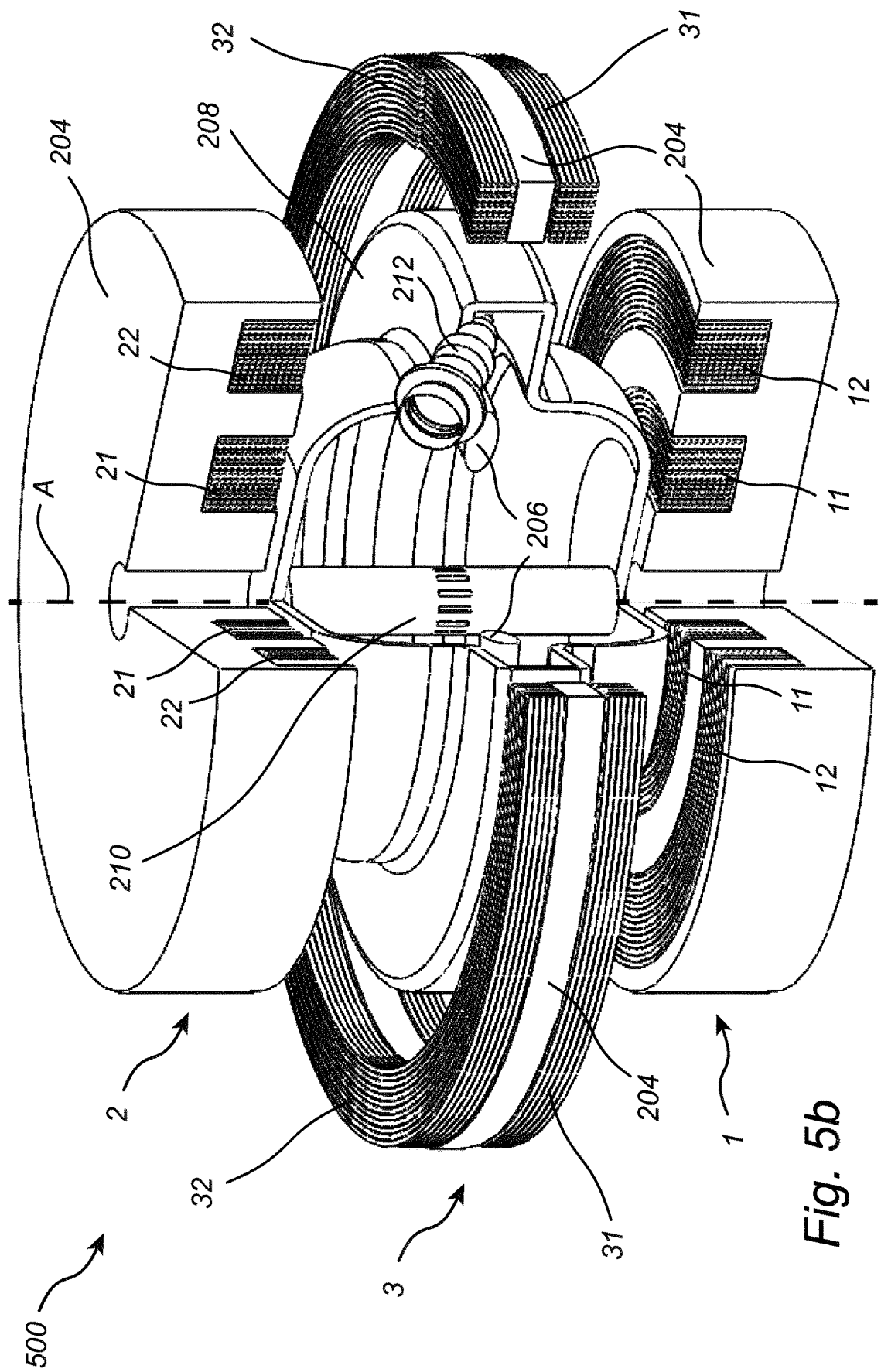

FIGS. 1a, 1b, and 1c show a first magnet system 1 and a second magnet system 2 that may be comprised in a plasma confinement device (cf. FIGS. 5a and 5b).

The first magnet system 1 comprises a first plurality of concentrically arranged circular-loop coils arranged around a symmetry axis A, for example, as shown a first, inner coil 11 and a second, outer, coil 12, arranged concentrically to radially outside the inner coil 11.

Further, the first magnet system 1 comprises a second magnet system 2 comprising a second plurality of circular-loop coils, likewise concentrically arranged around the axis A, but vertically displaced relative to the first magnet system. The second magnet system may, for example, as shown, comprise a first, inner coil 21 and a second, outer, coil 22, arranged concentrically to and radially outside the inner coil 21.

FIG. 1c shows a cross sectional view through the first magnet system 1 and the second magnet system 2 in a cross-sectional plane through the symmetry axis A.

The coils 21, 22 of the second magnet system 2 are arranged with mirror symmetry with respect to the coils 11, 12 of first magnet system 1 relative to a symmetry plane P, which is at equal distance to each of the first magnet system 1 and to the second magnet system 2.

Throughout this disclosure, reference may be made to coordinate systems and directions relative to the axis A and the symmetry plane P. In particular, coordinates and directions may be described with reference to a cylindrical coordinate system or to a cartesian coordinate system, each having as origin the intersection of the symmetry axis A and the symmetry plane P.

The cartesian coordinate system, with coordinates referred to as "x, y, z", "X, Y, Z", "A, B, C" or the like, should be understood as having the first two coordinate axes "x, y", "X, Y", "A, B", or the like, lying in the symmetry plane P and the third coordinate axis "z", "Z", "C", or the like, extending in a positive direction upwards (as seen in FIGS. 1-5) from the origin along the symmetry axis A.

If no units for spatial coordinates are disclosed, units of meters or degrees are implied. If no unit of time is disclosed, a unit of seconds is implied.

The cylindrical coordinate system, should be understood as having a radial direction and coordinate ("R", "r", or the like) extending from the origin at the intersection of the symmetry axis A and the symmetry plane P, an azimuth direction and coordinate ("phi", "Phi", or the like) measured as a rotational angle around the symmetry axis A, and an axial direction and coordinate ("z", "Z", "C" or the like) extending in a positive direction from the origin upwards along the symmetry axis A. Positive direction for the azimuth direction is according to the right-hand rule with respect to the positive axial direction.

Further, throughout this disclosure references will be made to figures showing simulated magnetic field (magnetic flux density) lines, i.e., equal magnetic potential lines, including FIGS. 2, 4a, 4b, 9, 10, 11, and 12. Due to the symmetry properties of the magnet systems disclosed herein, the magnetic field properties of such a quadrant are sufficient for describing the field configuration as a whole, i.e., due to the mirror symmetry with respect to the symmetry plane P and the rotational symmetry around the axis A. Therefore, a figure showing a quadrant should be interpreted as disclosing the field and magnet system configuration in all four quadrants, subject to the mention symmetry properties. Moreover, due to the rotational symmetry, the figures should be interpreted as disclosing three-dimensional magnetic fields and magnet systems.

Still with reference to FIG. 1c, the first plurality of concentrically arranged coils 11, 12 of the first magnet system 1 may, as shown, be identically designed to the second plurality of concentrically arranged coils 21, 22 of the second magnet system 2, respecting the mirror symmetry.

FIG. 1c further shows coil current directions during operation of the first magnet system and the second magnet system as used in a plasma confinement device (cf. FIGS. 5a and 5b).

In the first magnet system 1, the current of the inner coil 11 is configured to run in a direction into the cross-sectional plane (marked with a cross) on the right side of FIG. 1c and out of the cross-sectional plane (marked with a dotted circle) in the left side of FIG. 1c, i.e., counter-clockwise a seen from above the first magnet system. Conversely, the current of the outer coil 12 is configured to run in a direction out of the cross-sectional plane (marked with a dotted circle) on the right side of FIG. 1c and into the cross-sectional plane (marked with a cross circle) in the left side of FIG. 1c, i.e., clockwise a seen from above the first magnet system.

Thus, the first plurality of concentrically arranged circular-loop coils comprises a first coil 11 arranged to carry a current in a first direction, and a second coil 12 arranged to carry a current in a second direction opposite to the first direction.

Similarly, respecting the mirror symmetry with respect to the symmetry plane P, in the second magnet system 2, the current of the inner coil 21 is configured to run in a direction into the cross-sectional plane (marked with a cross) on the right side of FIG. 1c and out of the cross-sectional plane (marked with a dotted circle) in the left side of FIG. 1c, i.e., counter-clockwise a seen from above the first magnet system and the current of the outer coil 22 is configured to run in a direction out of the cross-sectional plane (marked with a dotted circle) on the right side of FIG. 1c and into the cross-sectional plane (marked with a cross circle) in the left side of FIG. 1c, i.e., clockwise a seen from above the first magnet system.

Thus, the currents of the second magnet system 2, with first magnet system 1 and the second magnet system 2 in operation, are arranged with mirror symmetry with respect to the first magnet system relative to the symmetry plane P located between the first magnet system 1 and the second magnet system 2.

As shown with a vector arrow 202 indicating the magnetic field (magnetic flux density) vector B, at the symmetry plane P, the mirror-symmetric configuration of currents in the first magnet system 1 and the second magnet system 2 creates, at the symmetry plane P, a magnetic field normal to the symmetry plane P. An annular, typically toroid-shaped, plasma confinement area 206 (cf. FIGS. 2, 5a and 5b), indicated with an approximate dashed ellipse, is formed at the symmetry plane P, as will be explained further in the following.

Thus, expressed in other words, a plasma confinement device may comprise two disc-shaped magnet systems 1, 2 facing each other in axial direction, with a space in-between where a plasma may be confined. Each magnet system 1, 2 has at least two coils 11, 12, 21, 22 where the current direction and magnitude create a normal magnetic field boundary condition at the symmetry plane P.

Further, still with reference to FIGS. 1a, 1 b, and 1c, the first plurality of concentrically arranged coils 11, 12 in the first magnet system 1 and the second plurality of concentrically arranged coils 21, 22 in the second magnet system 2 each may be embedded in respective core structures 204, which may be of ferromagnetic material, such as ferromagnetic steel. Alternatively, the core structure 204 may be of non-ferromagnetic material, such as non-ferromagnetic steel.

Optionally, as shown, the respective core structures 204 of the first magnet system 1 and the second magnet system 2 do not cover at least one coil, as shown all coils of the respective plurality of coils in a direction towards the symmetry plane P, but covers the respective coils 11, 12, 21, 22 in all other directions.

Figure 9:
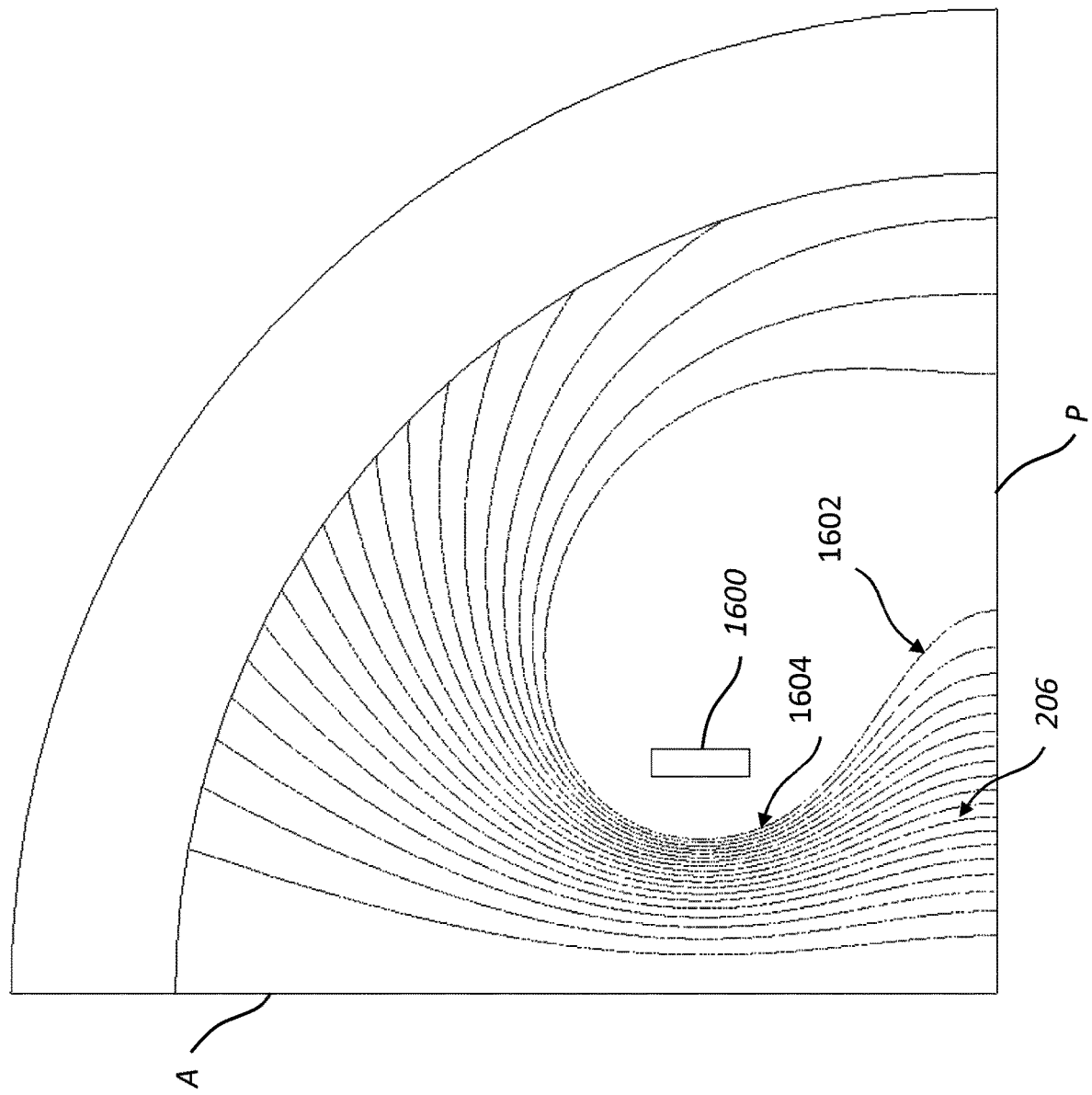
FIG. 9 is a planar view showing simulated magnetic field lines generated by a conventional straight magnetic mirror configuration.

For comparison purposes, FIG. 9 shows simulated magnetic field lines, of a straight magnetic mirror configuration comprising two coils, viz., a single coil 1600 in each hemisphere. As typical for such a straight magnetic mirror ("bottle") configuration, the magnetic field displays a region 1602 of relatively low magnetic flux density near the symmetry plane P and a region 1604 of relatively high magnetic flux density near the coil 1600, creating a confinement area 206 for charged particles, based on the principle of magnetic reflection, as explained above. Moreover, as seen from radially outside the confinement area 206, i.e. from the right in FIG. 9, a relatively large region near the symmetry plane displays convex magnetic field lines, while a smaller region closer to the coil 1600 displays concave magnetic field lines, the former, as per the first property discussed above, being disadvantageous and the latter being advantageous. Further, it can be noted that, at the symmetry plane P, the magnetic flux density is decreasing with increasing radius.

Figure 2:
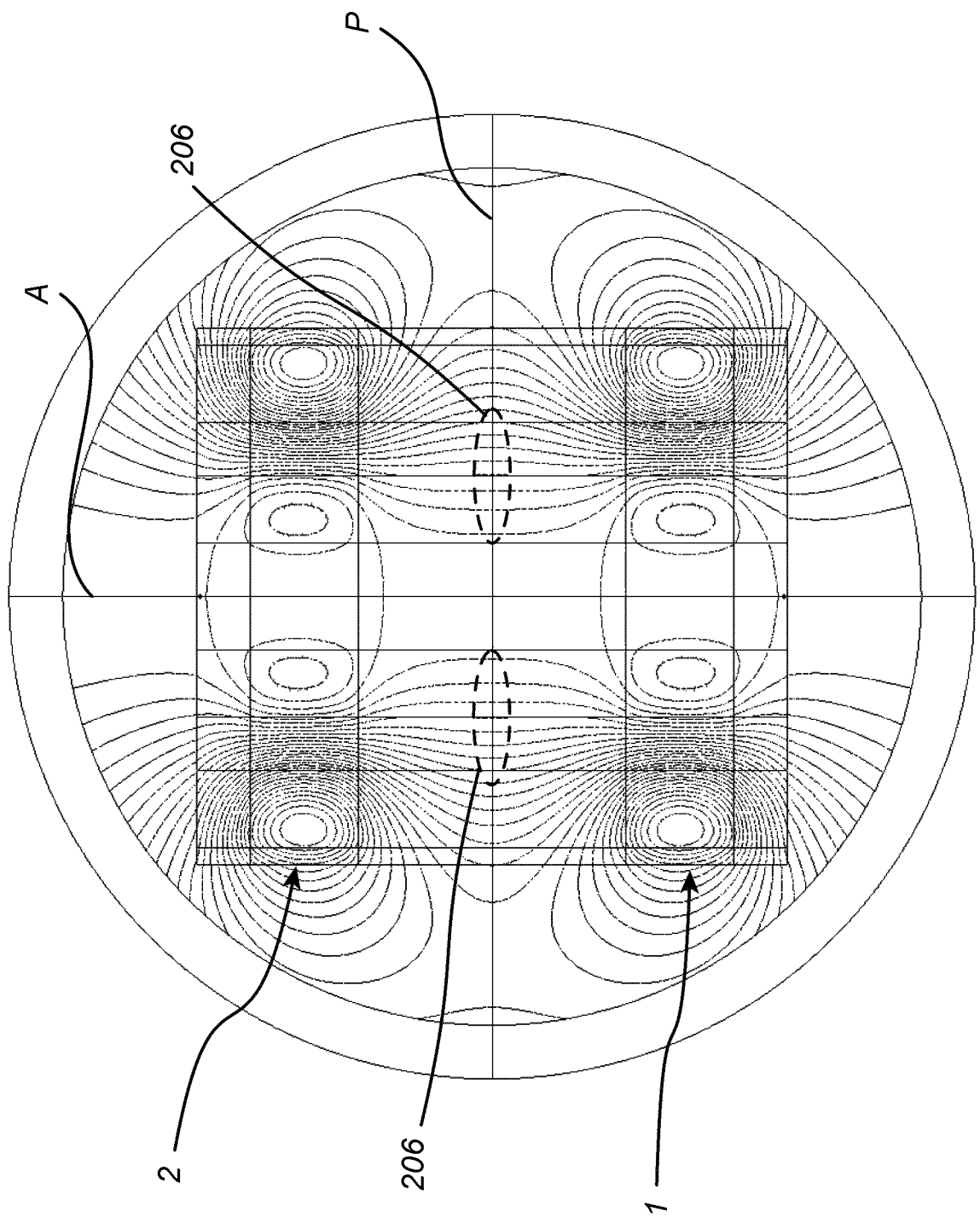
FIG. 2 is a planar view showing simulated magnetic field lines generated by the first and second magnet systems of FIGS. 1a, 1b, and 1c.

The disclosed magnet system configurations makes the magnetic field normal to the symmetry plane P throughout the symmetry plane P, as is evident by the magnetic field lines crossing the symmetry plane P at right angles. FIG. 2, just as FIG. 1c, shows the magnetic field lines in a cross-sectional plane through the axis A. Due to the rotational symmetry of the first magnet system 1 and the second magnet system 2, the magnetic field configuration is also rotationally symmetric, so that to that FIG. 2 is representative for any such cross-sectional plane and therefore for the whole field configuration. In particular, the magnetic field has no toroidal component, i.e., in a direction pointing into or out of the cross-sectional plane of FIG. 2, which is the azimuth direction referred to above. In other words, the magnetic field vectors lie in the cross-sectional plane for any such cross-sectional plane through the axis A. The same applies for the configurations of FIGS. 9-13.

In FIG. 2, magnetic field lines resulting from the mirror-symmetric configuration of currents in the first magnet system 1 and the second magnet system 2 discussed above in conjunction with FIGS. 1a, 1 b, and 1c, are shown. The resulting magnetic field configuration results in the annular confinement area 206, again represented by approximate dashed ellipses, in which ions of a plasma may be confined.

The plasma confinement area is radially restricted between an inner radius and an outer radius, as confirmed by simulations. Plasma ions confined in the plasma confinement device, in the plasma confinement area 206 at the symmetry plane P, will perform a circular gyration motion in that plane due to the magnetic field perpendicular to that plane. As mentioned, no toroidal field is present. Given the absence of a toroidal magnetic field component, therefore, there will be no axial Lorentz force on the ions at the symmetry plane P. Moving away from the symmetry plane in axial direction, along a field line, the Lorentz force may push the ion back towards the symmetry plane, confining the ion at the symmetry plane.

Unlike the situation in a tokamak, where the plasma is confined with toroidal and poloidal fields, a confinement device according to the present disclosure confines plasma with axial (parallel to the axis A) and radial fields.

Figure 10:
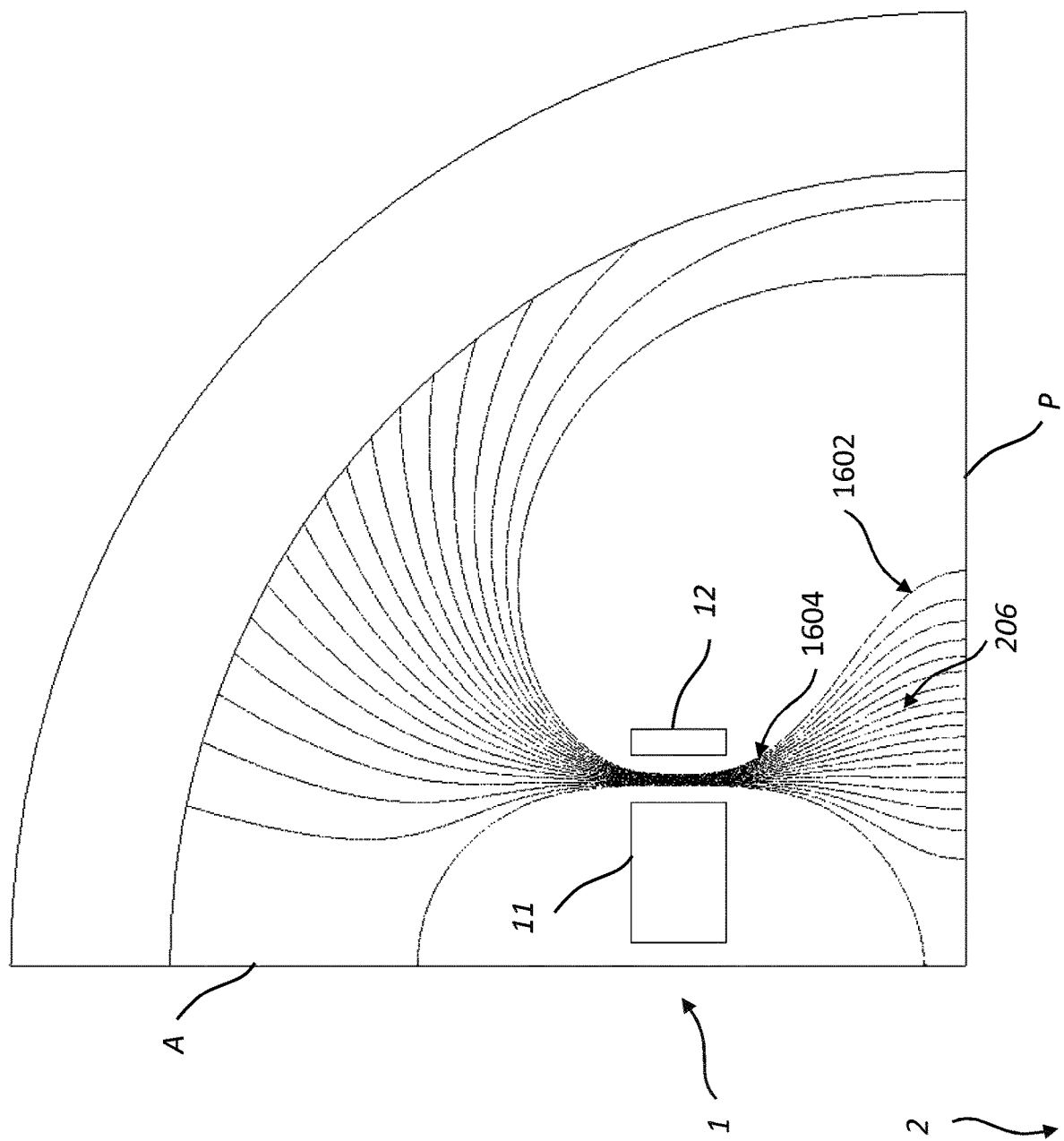
FIG. 10 is a planar view showing simulated magnetic field lines generated by first and second magnet systems.

FIG. 10 shows another configuration that may be comprised in a plasma confinement device, again, arranged with a first magnet system 1 comprising a first coil 11 arranged to carry a current in a first direction; and a second coil 12 arranged to carry a current in a second direction opposite to the first direction (cf. FIG. 1*c*); and a second magnet system (not shown) comprising a first and a second concentrically arranged circular-loop coil (not shown), arranged with mirror symmetry with respect to said first magnet system relative to the symmetry plane P located between the first magnet system 1 and the second magnet system 2. Just as for the straight magnetic mirror of FIG. 9, a confinement area for charged particles, i.e., a plasma confinement area 206, is the symmetry plane P with a magnetic field normal to the symmetry plane at the symmetry plane.

Just as discussed above in conjunction with FIG. 9, as shown in FIG. 10, and also evident in FIG. 2, through an appropriate choice of the geometries of the of the coils 11. 12 of the first magnet system, and the second magnet system 2, and the currents carried therein, it is possible to achieve a field configuration displaying a region 1602 of relatively low magnetic flux density near the symmetry plane P and a region 1604 of relatively high magnetic flux density near the coils 11, 12, creating a confinement area 206 for charged particles, based on the principle of magnetic reflection. Moreover, just as in FIG. 10, as seen from radially outside the confinement area 206, i.e. from the right in FIG. 9, the region 1602 near the symmetry plane displays convex magnetic field lines, while the region 1604 displays concave magnetic field lines.

Moreover, as is evident from comparing FIG. 10 (and FIG. 2) with FIG. 9, an appropriate choice of the geometry of the coils and the currents running therein, allows for a considerably increased magnetic flux density in the region 1604 of relatively high magnetic flux density near the coils 11, 12. This may provide a higher mirror ratio, improving confinement of the charged particles in a plasma, due to the reduced loss cone.

Figure 3A:
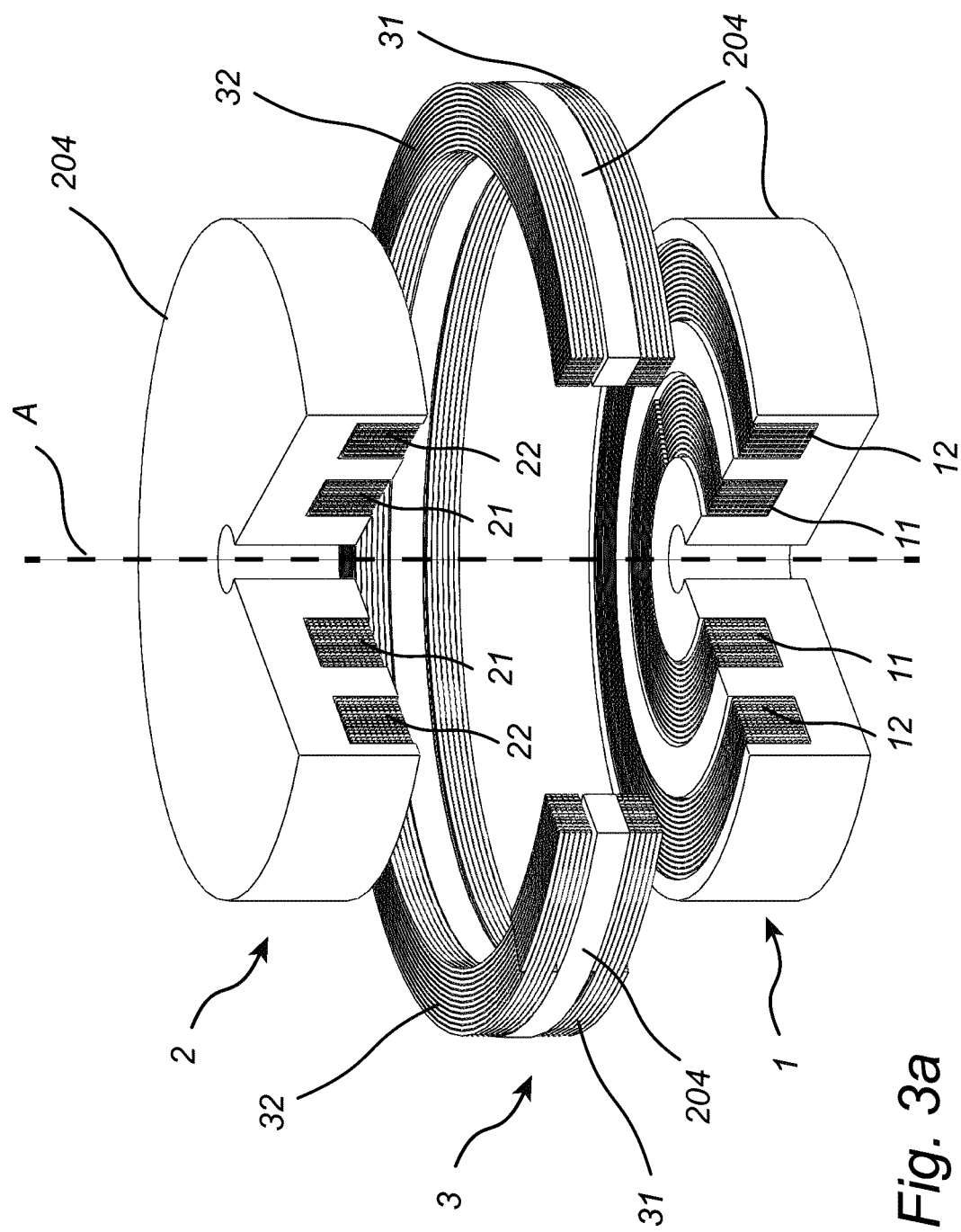
FIG. 3a is a cut-out perspective view of a first magnet system, a second magnet system, and a third magnet system comprised that may be comprised in a plasma confinement device.
Figure 3B:
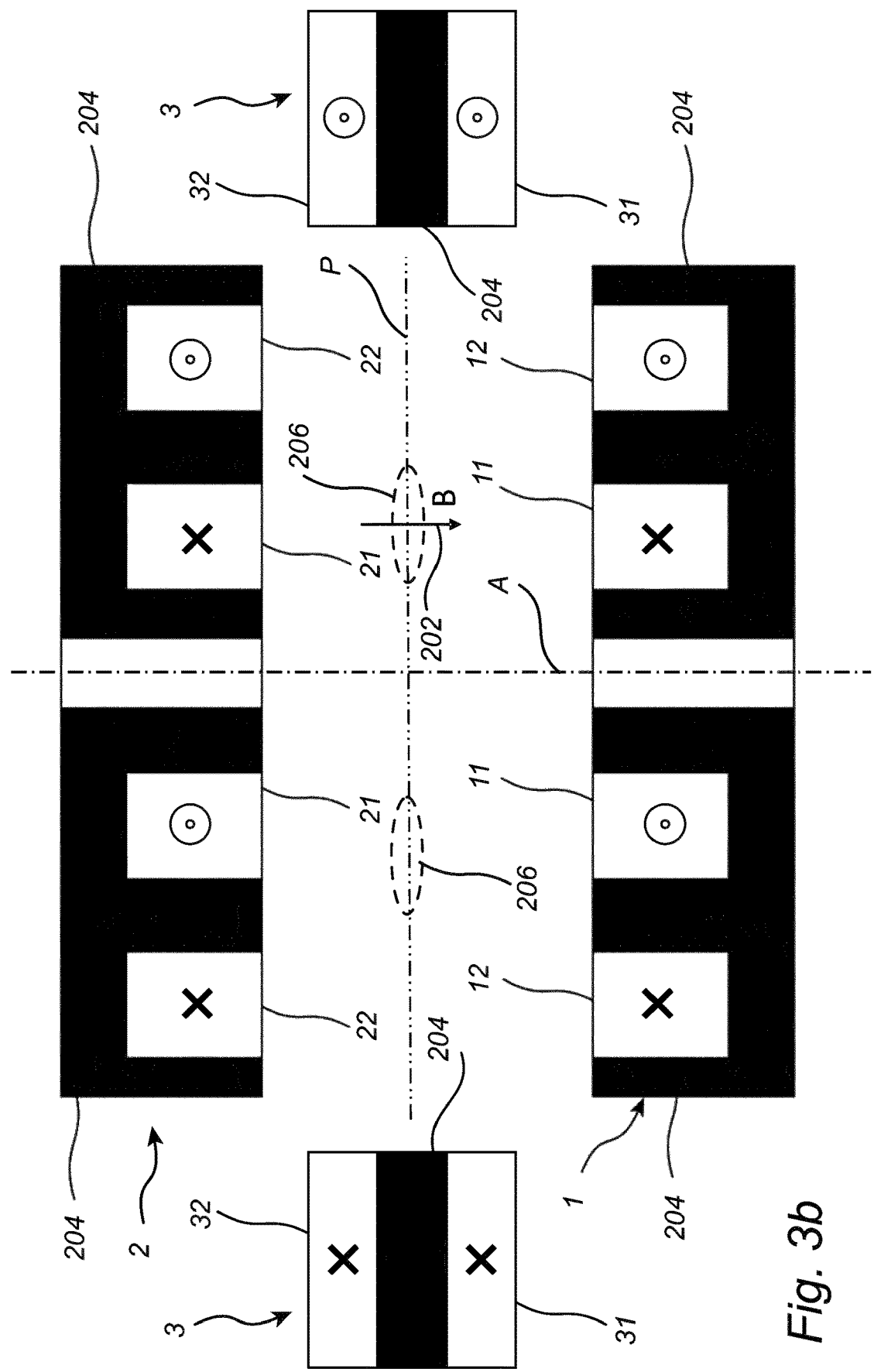

FIGS. 3*a* and 3*b* show a first magnet system 1, a second magnet system 2, and a third magnet system that may be comprised in a plasma confinement device (cf. FIGS. 5*a* and 5*b*). Unless specifically mentioned below, the magnet systems of FIGS. 3*a*, 3*b*, and FIG. 4 have the same features and characteristics as the first magnet system and the second magnet system described above in conjunction with FIGS. 1*a*, 1*b*, 1*c*, and 2. The third magnet system 3 is arranged radially outside, with respect to the axis A, the plasma confinement area 206.

Further, the third magnet system 3 may, as shown, be located radially outside, with respect to the axis A, the first magnet system 1 and the second magnet system 2.

The third magnet system 3 comprises at least one circular-loop coil, for example, as shown, a first circular-coil loop coil 31 arranged on the same side of the symmetry plane P as the first magnet system and a second circular-coil loop 32 arranged on the opposite side of the symmetry plane P, wherein the second coil 32 is arranged with mirror symmetry relative to the first coil 31. In particular, with reference to FIG. 3*b*, each of the first coil 31 and the second coil 32 has a current configured to run, with the magnet system in operation, in a direction into the cross-sectional plane (marked with a cross) on the left side of FIG. 3*b* and out of the cross-sectional plane (marked with a dotted circle) on the right side of FIG. 3*c*, i.e., clockwise as seen from above the first magnet system.

Figure 4A:
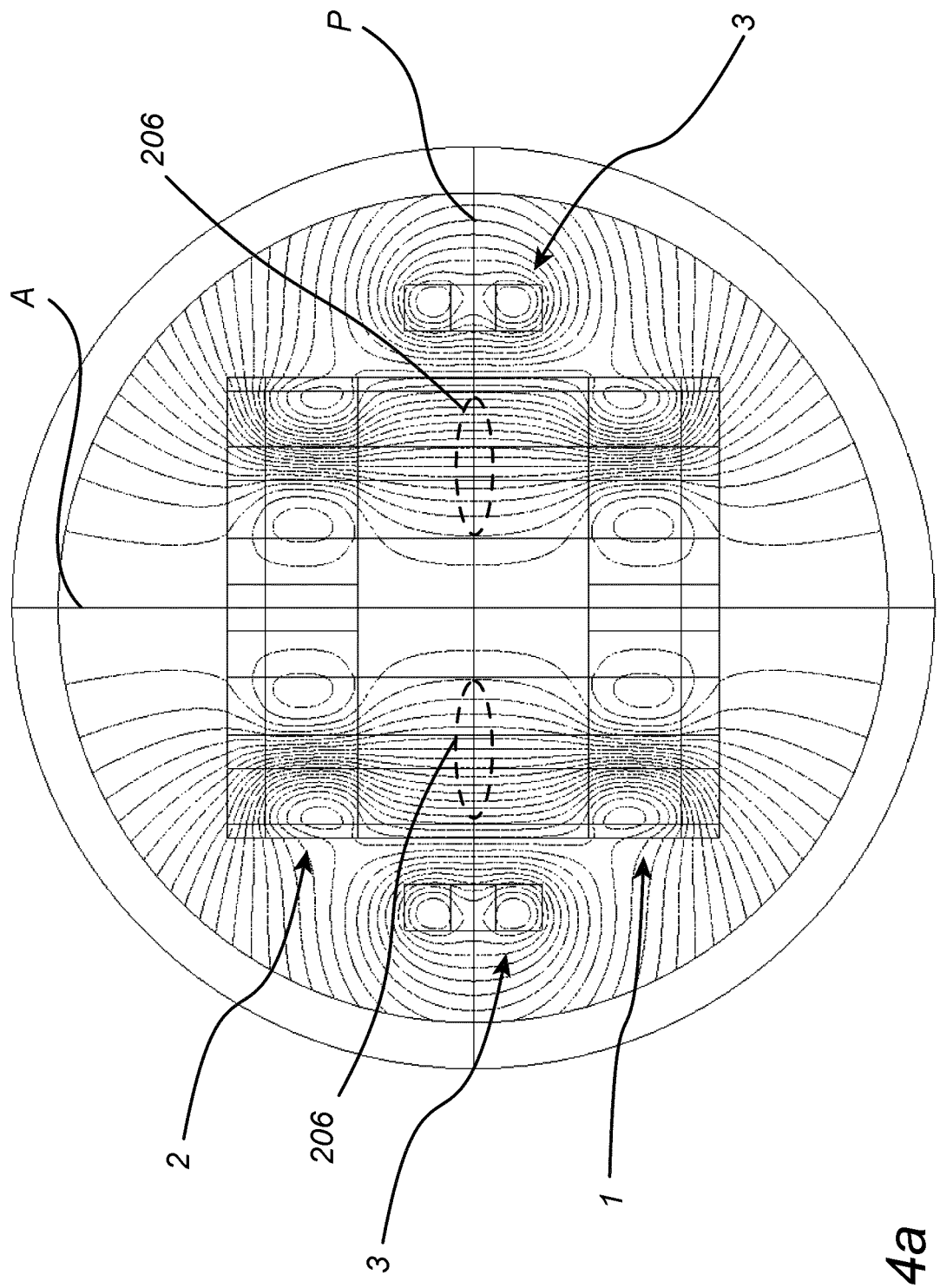
FIGS. 4a and 4b are planar views showing simulated magnetic field lines generated by the first, second, and third magnet systems of FIGS. 3a and 3b.
Figure 4B:
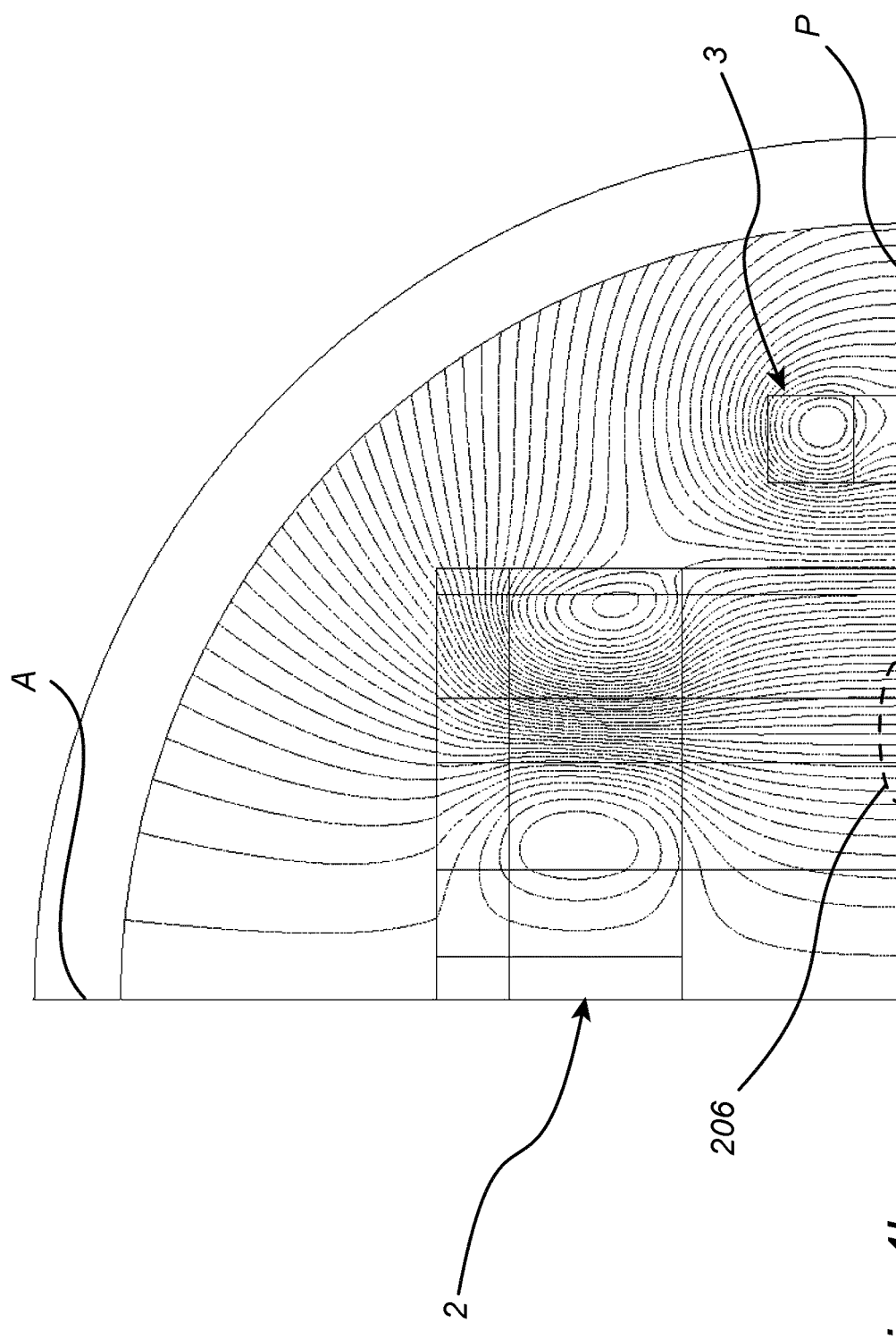

Resulting simulated magnetic field lines are shown in FIGS. 4*a* and 4*b*. The magnetic field configuration is similar to that of FIG. 2. In particular, an annular plasma confinement area 206 is formed, just as described above in conjunction with FIGS. 1*a*, 1*b*, 1*c*, and 2. FIG. 4*b* shows a quadrant of FIG. 4*a* close up. Due to the symmetry properties of the magnet systems, the magnetic field properties of such a quadrant are sufficient for describing the field configuration as a whole, i.e., due to the mirror symmetry with respect to the symmetry plane P and the rotational symmetry around the axis A.

Figure 11:
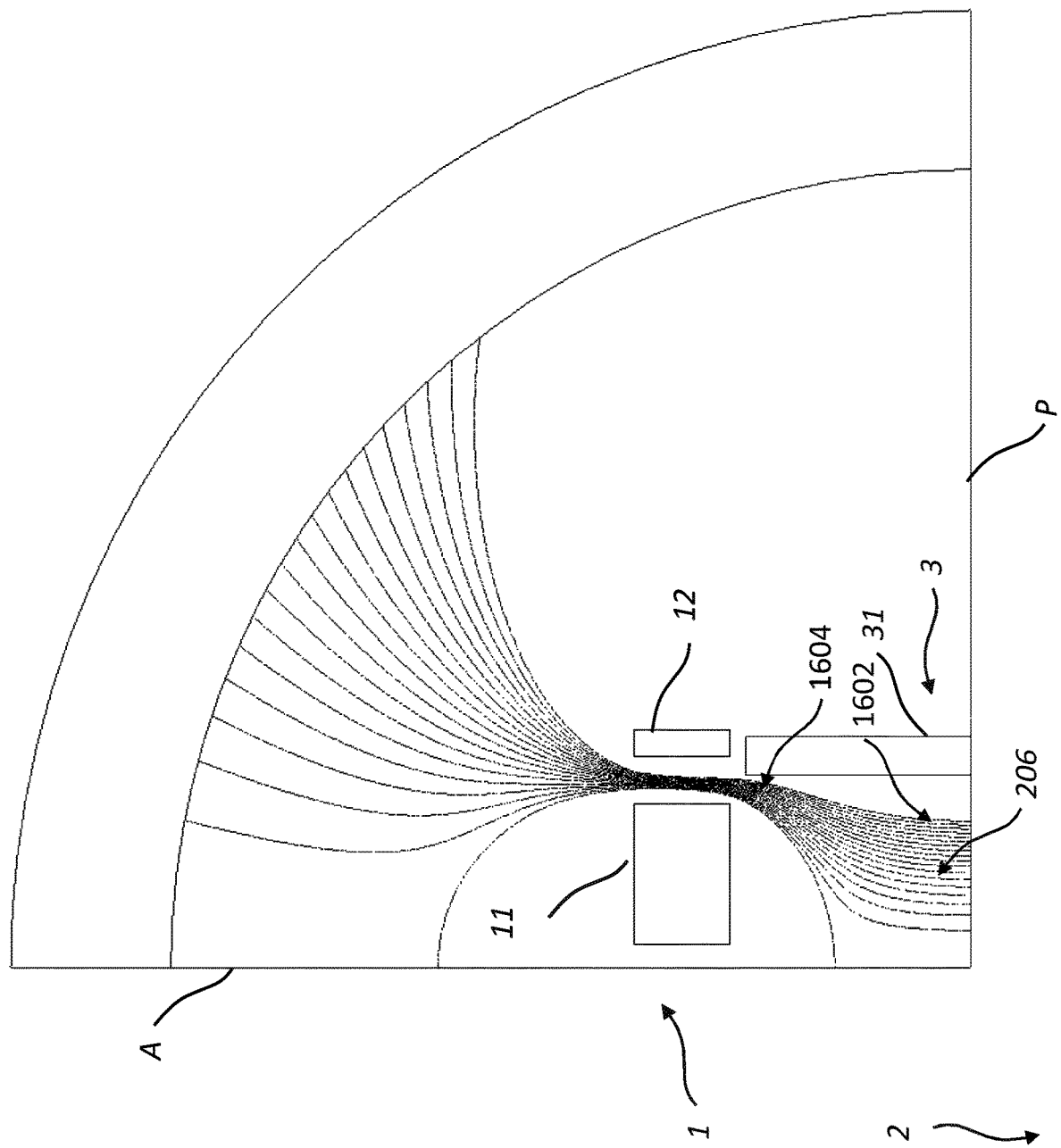
FIG. 11 is a planar view showing simulated magnetic field lines generated by first, second, and third magnet systems.

FIG. 11 shows yet another configuration that may be comprised in a plasma confinement device. In addition to the first magnet system 1 and the second magnet system 2 of FIG. 10, just as in FIGS. 3*a* and 3*b*, a third magnet system 3 is arranged radially outside the plasma confinement area 206. The third magnet system comprises a circular-loop coil 31.

Still with reference to FIG. 11, just as discussed above in conjunction with FIG. 9, the field configuration displaying a region 1602 of relatively low magnetic flux density near the symmetry plane P and a region 1604 of relatively high magnetic flux density near the coils 11, 12, creating a confinement area 206 for charged particles, based on the principle of magnetic reflection.

Moreover, still with reference to FIG. 11, just as in FIG. 10, as seen from radially outside the confinement area 206, i.e. from the right in FIG. 9, the region 1602 near the symmetry plane displays concave magnetic field lines, as seen from outside the plasma confinement area 206, while the region 1604 displays convex magnetic field lines, again as seen from outside the plasma confinement area 206. However, the region of concave magnetic field lines is larger than with the configuration of FIG. 10, corresponding to a majority of the plasma confinement area.

Moreover, still with reference to FIG. 11, just as in FIG. 10, an appropriate choice of the geometry of the coils and the currents running therein, allows for a considerably increased magnetic flux density in the region 1604 of relatively high magnetic flux density near the coils 11, 12, providing for a high mirror ratio.

Furthermore, as evident from FIG. 11 (and FIGS. 4*a* and 4*b*), through an appropriate choice of the current through the coil 31 of the third magnet system, a field configuration is achievable with a radially strictly increasing magnetic flux density in the plasma confinement area 206.

Figure 12:
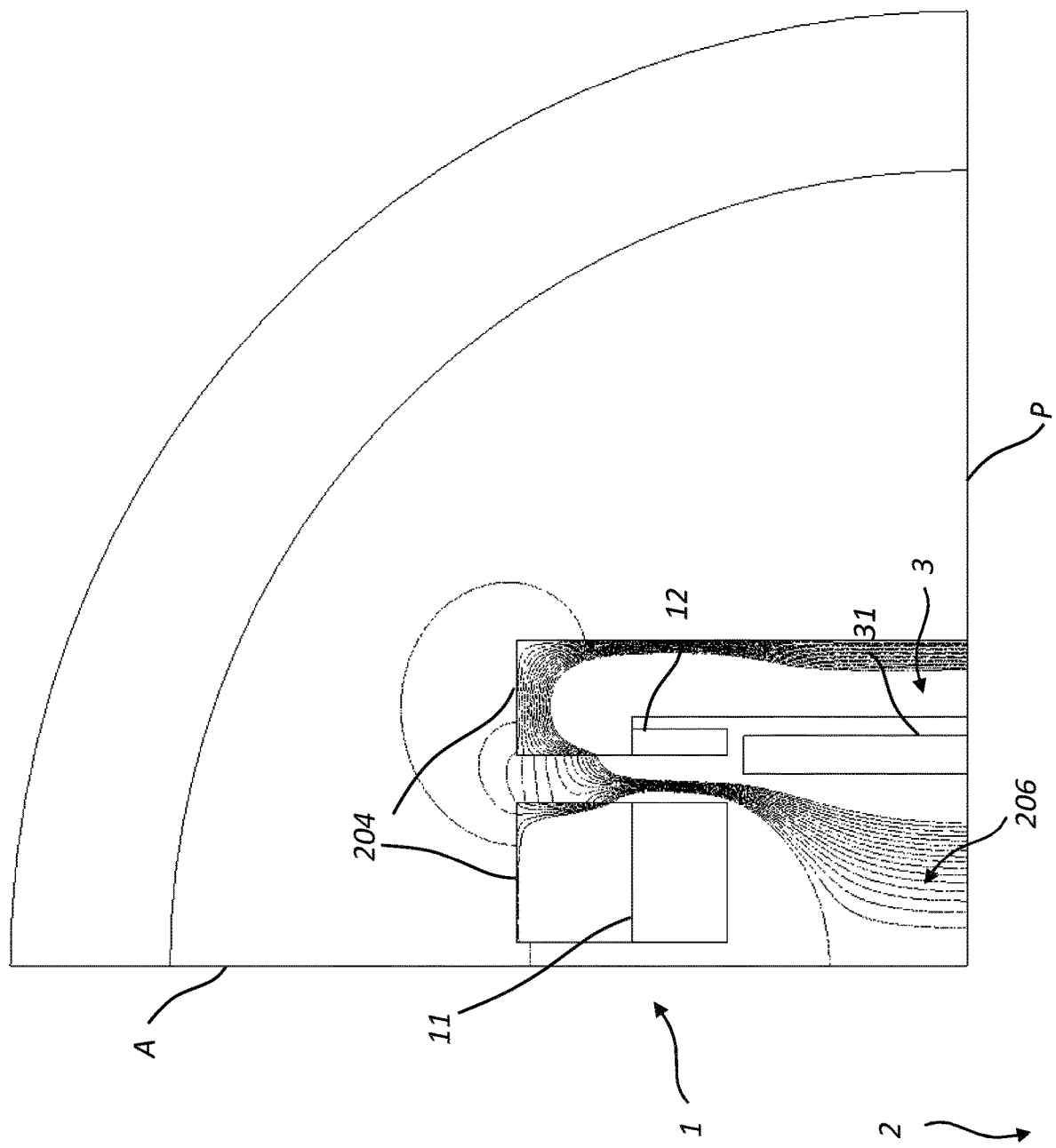
FIG. 12 is a planar view showing simulated magnetic field lines generated by first, second, and third magnet systems, each of the respective coils in the first magnet system and the second magnet system being embedded in respective ferromagnetic shielding.

FIG. 12, shows yet another configuration that may be comprised in a plasma confinement device. In addition to the configuration of FIG. 11, each of the respective coils in the first magnet system 1 and the second magnet system 2 is embedded in respective ferromagnetic shielding. This focuses the magnetic field, allowing for a higher mirror ratio.

Figure 13:
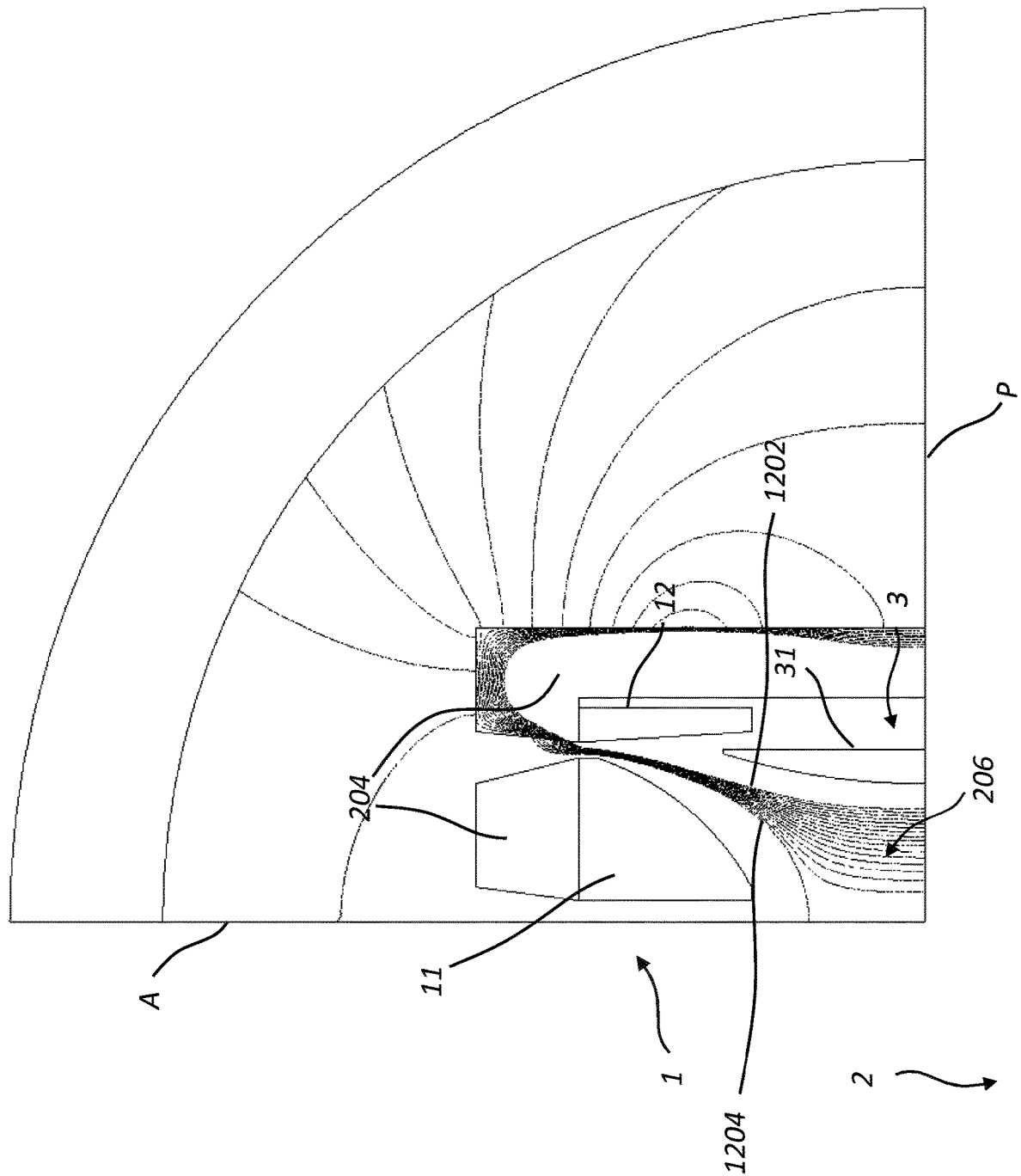
FIG. 13 is a planar view showing simulated magnetic field lines generated by first, second, and third magnet systems.

FIG. 13, shows yet another configuration that may be comprised in a plasma confinement device. In this example configuration, as compared to the configuration of FIG. 12, the coils 11, 12, 31 have tapered and/or convex surfaces. Hereby, as evident from FIG. 13, a magnetic field configuration is achievable where the radial outside perimeter 1202 of the plasma confinement area 260, all the way up a reflection point, has concave magnetic field lines, and also the radially inside perimeter 1204 while the magnetic flux density is radially strictly increasing.

FIGS. 5a and 5b each show a plasma confinement device 500, each comprising a first 1 and a second 2 magnet system as detailed above in conjunction with FIGS. 1a, 1b, 1c, and 2 and an optional third magnet system 3, as detailed above in conjunction with FIGS. 3a, 3b, 4a, and 4b. Each such plasma confinement device 500 may be used in a fusion reactor.

Further, each plasma confinement device 500 comprises a plasma vessel 208, as well-known per se in plasma fusion technology. The plasma vessel may, as shown be located between the first magnet system 1 and the second magnet system 2. Further, the plasma vessel 208 may, as shown, be located radially inside the third magnet system 3, if such a system is present. The plasma vessel 208, may as shown, be rotationally symmetric around the axis A. The reactor vessel 208 is located so that the annular, toroid-shaped, plasma confinement area 206 is located inside the reactor vessel 208.

Physical dimensions of the plasma confinement device 500 depend on many parameters such as engineering current density in the magnetic coils, the degree of confinement of alpha particles, the desired plasma volume, etc. Below follow typical dimensions that may provide good confinement of alpha particles and a plasma volume of roughly 15 $m^3$ at an engineering current density in the magnet systems of 10 $A/mm^2$:

Outer diameter the first magnet system 1 and the second magnet system 2: 8 m-16 m, typically 12 m.

Height of each of the coils 11, 12, 21, 22: 1.5 m-3.5 m, typically 2.5 m Thickness of the core 204 embedding coils: 0.6 m-1.3 m, typically 1.0 m.

Distance between the upper edge of the first magnet system 1 and the lower edge of the second magnet system 2: 4.0 m-8.0 m, typically 6.0 m Outer diameter of the third magnet system 3: 10.0 m-22 m, typically 16.0 m.

By varying the coil current or coil current the magnetic field configuration may be changed as to control a plasma confined in the plasma confinement area 206. For example, the radius of the plasma confinement area may be changed.

FIG. 5b shows a plasma confinement device 500 having an optional microwave plasma heating device 210, as known per se, located at the center of the device 500 at the axis A, and thus radially inside of the plasma confinement area 206.

Further, the plasma confinement device 500 may have an optional ion beam insertion arrangement 212, as known per se, leading into the vessel 208 and being located radially outside the plasma confinement area 206.

An ion beam, for example comprising high-energy alpha particles, may be inserted using the ion beam insertion device 210 in an area radially outside the plasma confinement area 206, after which ions from the ion beam may be allowed to drift towards lower radius into the plasma confinement area 206, thereby heating the plasma, which may in the next phase be self-sustaining in heating, i.e. ignited plasma.

Alternatively (not shown) an ion beam, for example comprising high-energy alpha particles, may be inserted using such an ion beam insertion device in an area radially inside the plasma confinement area 206, after which ions from the ion beam may be allowed to drift towards higher radius into the plasma confinement area 206, thereby heating the plasma.

Thus, the plasma confinement device design according to the present disclosure allows accessibility for heating devises both at the outer radius and at the center of the system.

Alternatively, again, the plasma may be heated by the microwave plasma heating device 210.

Figure 6:
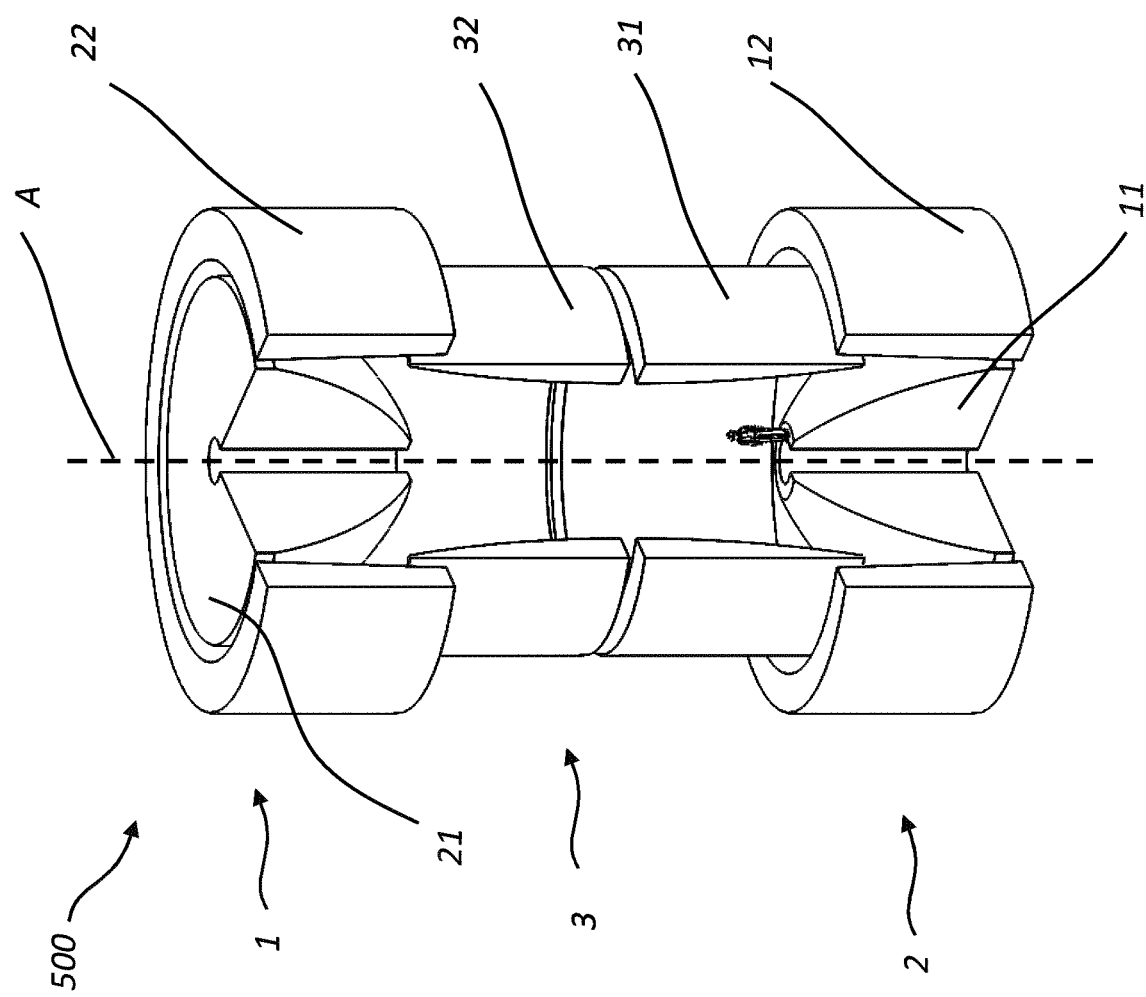
FIGS. 6, 7, and 8 are cut-out perspective views of a plasma confinement device.
Figure 7:
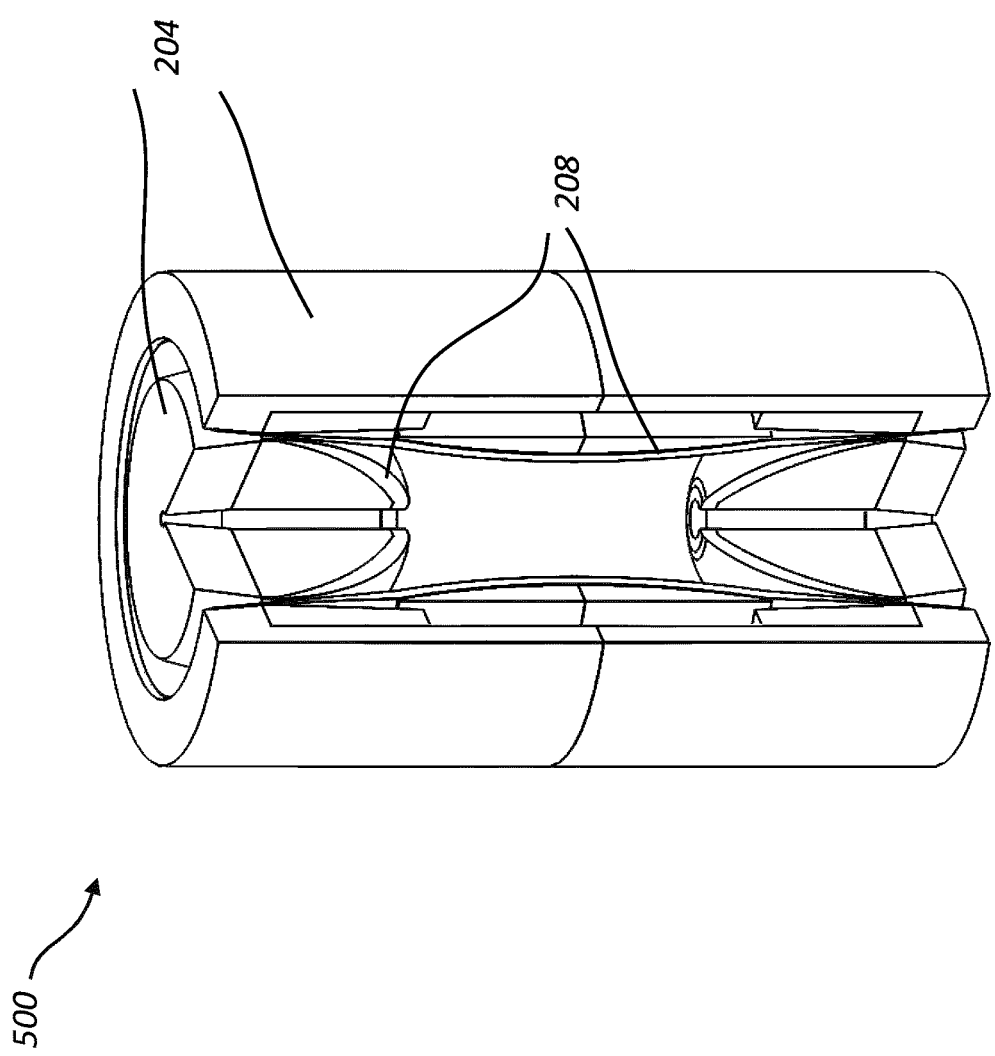
Figure 8:
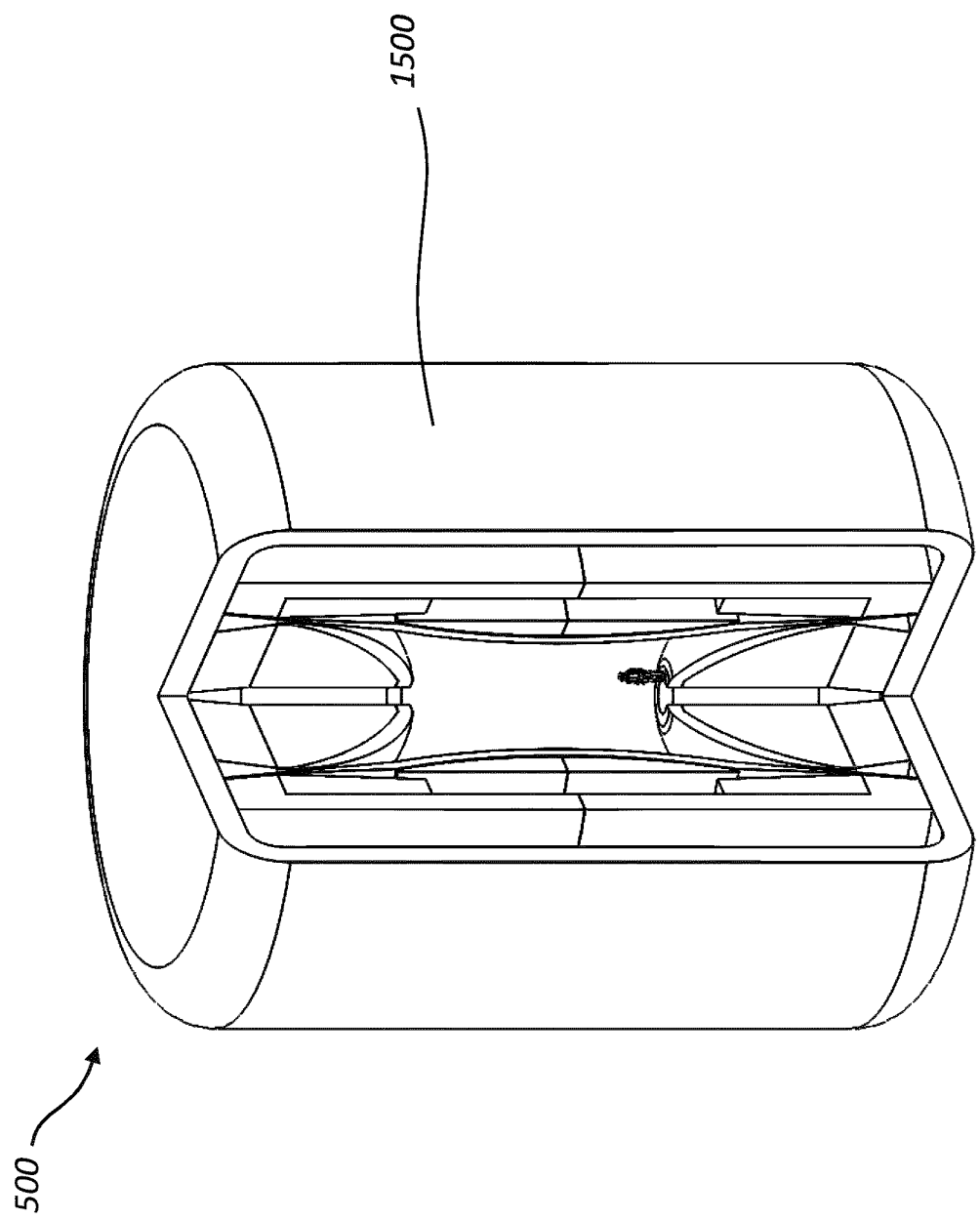

FIGS. 6, 7, and 8 are cut-out perspective views of another plasma confinement device 500 comprising a first 1 a second 2, and a third 3 magnet system as detailed above in conjunction with FIG. 13. The plasma confinement device 500 may be used in a fusion reactor.

Further, as shown in FIG. 7 the plasma confinement device 500 may comprise a plasma vessel 208, as well-known per se in plasma fusion technology. As shown, a plasma vessel 208 may be located radially inside the coils 31, 32 of the third magnet system 3, radially inside the outer coils 22, 12 of, respectively, the first magnet system 1 and the second magnet system 2, and radially outside and axially inside the inner coils 11, 21 of, respectively, the first magnet system 1 and the second magnet system 2.

Further, FIG. 7 shows the ferromagnetic embedding 204.

Finally, FIG. 8 shoes the plasma confinement device 500 being contained in a housing 1500.

Typical dimensions may be as follows. Including the housing 1500, the device 500 may have diameter of about 25 m and a height of about 35 m. The inner diameter of the coils of the third magnet system 3 may be about 12 m. The minimal distance between the inner coils 11, 21 of, respectively, the first magnet system 1 and the second magnet system 2, may be about 11 m.

According to the present disclosure, the overall current in a system of particles, i.e., plasma, confined therein may be zero, or close to zero. This may result in a much less dynamic plasma compared to the toroidal based reactors, such as tokamaks. Such a less dynamic plasma may have less problems with current-driven plasma instabilities, such as kink instability.

In the following, simulation results for a plasma confinement device according to the present inventive concept will be discussed, with reference to FIGS. 14a, 14b, 15, 16, and 17, validating the ability of the plasma confinement device 500 to confine fusion plasma ions. Confining a fusion plasma implies confining deuterium ions, tritium ions, alpha particles, and electrons by the magnetic field in the plasma volume. Alpha particles, one of the products of deuterium-tritium fusion, with a kinetic energy of 3.5 MeV (around 13.000.000 m/s) are by far the hardest particles to confine.

If an alpha particle can be confined, it will contribute to the heating of the plasma so that an ignited plasma is self-sustained by confined alpha particles. Burning plasma needs external energy, but less than the heating energy produced by the fusion process. Such heating is provided by fusion-product alpha-particles. Thus, confining alpha particles is important.

Deuterium and tritium will fuse at 12 keV or even lower. To confine a lighter ion at a lower energy is much easier than the heavy ion at high energy. If fusion-product alpha particles may be confined, deuterium and tritium ions as well as the electrons will also be confined in the same volume, i.e., if the alpha particles are confined, deuterium and tritium ions will also be confined.

Simulations were performed of trajectories of charged particles with in a magnetic field computed by finite element method (FEM) simulation, verifying the capability of charged particle confinement.

Since the system is rotationally symmetric, it could be described in a two-dimensional (2D) simulation. Furthermore, since there is mirror symmetry between the two first magnet system and the second magnet system, a first quadrant (cf. FIGS. 4b, 9-13) could fully define the whole volume of the system.

Particle trajectories were calculated iteratively, taking into account the Lorentz force on the particle and Newton's second law.

FIGS. 14a, 14b, 15, 16, and 17 show one-particle simulation results in the configuration discussed above in conjunction with FIGS. 6, 7, 8, and 13.

Figure 14B:
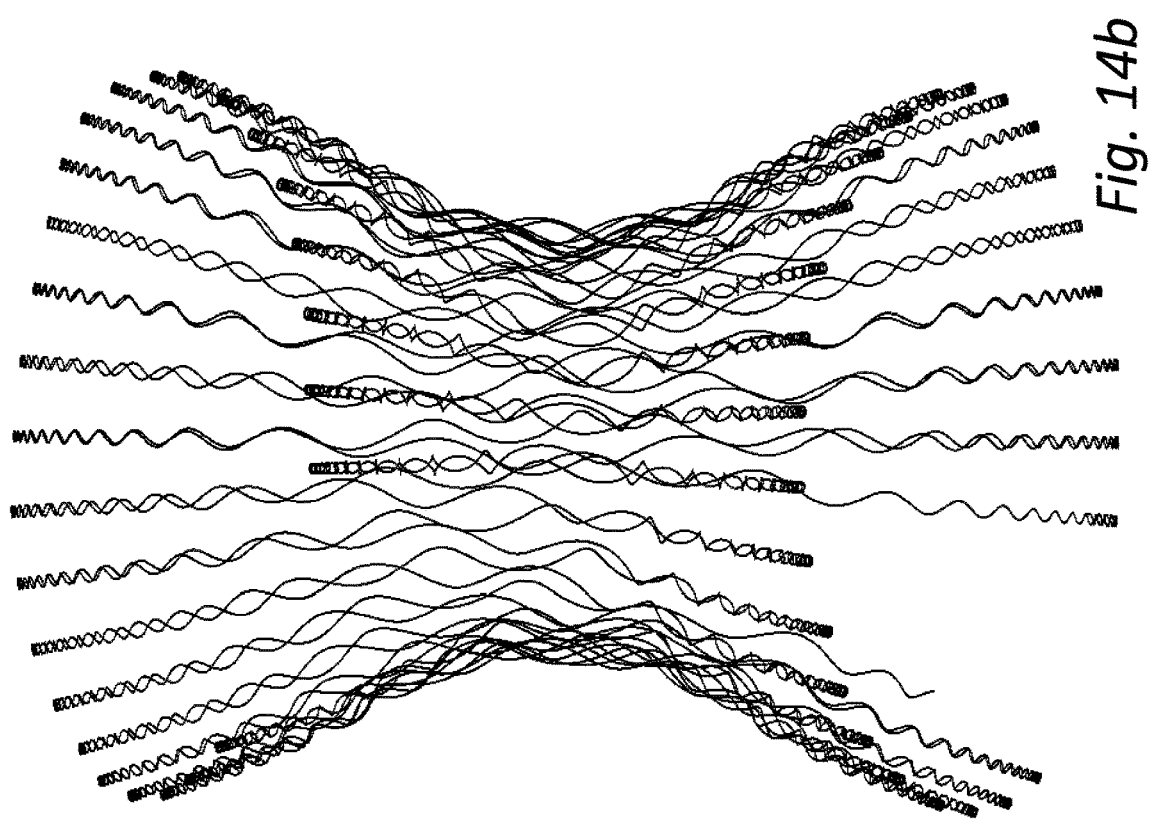
FIGS. 14a and 14b show one-particle simulation results in the configuration of FIGS. 6, 7, 8, and 13.
Figure 14A:
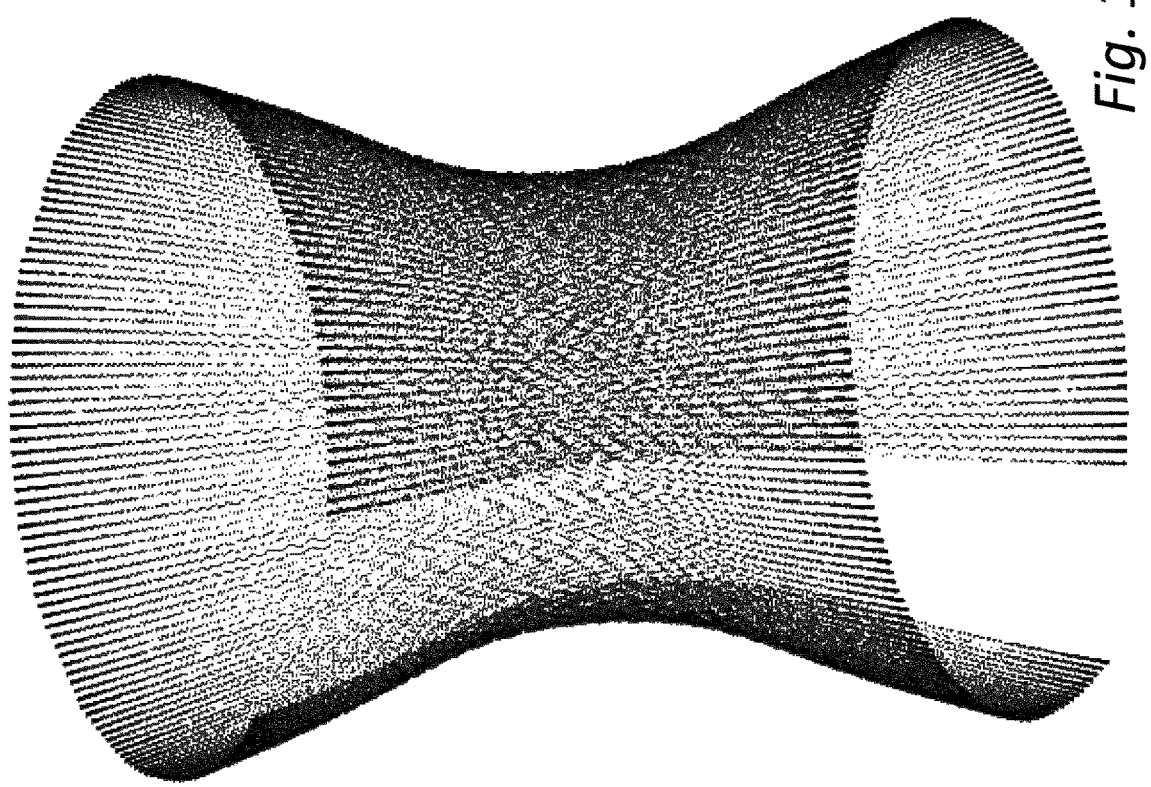

FIG. 14a shows the simulated path of a deuteron with a kinetic energy of 100 keV, while FIG. 14b shows the simulated path of an alpha particle with a kinetic energy of 3.5 MeV, i.e., as typical as a product from a fusion between a deuterium ion and a tritium ion. Both particles are confined in the plasma confinement area, being magnetically reflected at respective endpoints. To a first approximation, for a given initial velocity vector, the gyrocenter of the charged particles will follow a given field line and be reflected at the same endpoint regardless of the particle kinetic energy or charge. However, since the particles will different gyro spin radii (Larmor radius), the drift will be different.

FIGS. 15, 16, and 17 show, respectively, simulated charged particle trajectories with initial radial positions of 1.5 m, 3.0 m, and 4.5 m, each for $v_z/v_R$ (axial velocity to radial velocity) ratios of 0.5, 1.5, 2.5, showing confinement of charged particles for each of these configurations.

The inventive concept has mainly been described above with reference to example embodiments. However, as is readily appreciated by a person skilled in the art, other embodiments than the ones disclosed above are equally possible within the scope of the inventive concept, as defined by the appended patent claims.

The invention claimed is:

1. A plasma confinement device, comprising:
    a first magnet system comprising a first plurality of concentrically arranged circular-loop coils, comprising:
        a first coil arranged to carry a current in a first direction; and
        a second coil arranged to carry a current in a second direction opposite to said first direction; and
    a second magnet system comprising a second plurality of concentrically arranged circular-loop coils, arranged with mirror symmetry with respect to said first magnet system relative to a symmetry plane located between said first magnet system and said second magnet system,
    creating an annular plasma confinement area at said symmetry plane with a magnetic field normal to said symmetry plane at said symmetry plane.

2. The device of claim 1, wherein said first plurality of concentrically arranged coils is identically designed to said second plurality of concentrically arranged coils.

3. The device of claim 1, further comprising a third magnet system arranged radially outside said plasma confinement area, said third magnet system comprising at least one circular-loop coil.

4. The device of claim 3, wherein said third magnet system comprises a first coil arranged on a same side of said symmetry plane as said first magnet system and a second coil arranged on an opposite side of said symmetry plane, wherein said second coil is arranged with mirror symmetry relative to said first coil.

5. The device of claim 1, wherein said first plurality of concentrically arranged coils in said first magnet system and said second plurality of concentrically arranged coils in said second magnet system each are embedded in respective ferromagnetic structures.

6. The device of claim 5, wherein a said ferromagnetic structure does not cover at least one coil of a respective said plurality of coils in a direction towards said symmetry plane.

7. The device of claim 5, wherein a said ferromagnetic structure comprises ferromagnetic steel.

8. A method of plasma confinement, comprising:
    in a first magnet system comprising a first plurality of concentrically arranged circular-loop coils, a first coil carrying a current in a first direction and a second coil carrying a current in a second direction opposite to said first direction; and
    a second magnet system comprising a second plurality of concentrically arranged circular-loop coils carrying currents with mirror symmetry with respect to said first magnet system relative to a symmetry plane located between said first magnet system and said second magnet system,
creating an annular plasma confinement area at said symmetry plane with a magnetic field normal to said symmetry plane.

9. The method of claim 8, further comprising:
    controlling a confined plasma by current adjustment in a third magnet system arranged radially outside said plasma confinement area.

10. The method of claim 9, wherein said controlling comprises changing a radius of said plasma confinement area.

11. The method of claim 8, further comprising:
    heating said plasma by inserting an ion beam in an area radially outside said plasma confinement area or radially inside said plasma confinement area and allowing ions from said ion beam to drift into said plasma confinement area.

12. The method of claim 8, wherein the method is carried out in a fusion reactor.

* * * * *